United States Patent
Liu et al.

(10) Patent No.: US 12,444,130 B2
(45) Date of Patent: Oct. 14, 2025

(54) METHOD AND SYSTEM FOR RECONSTRUCTING THE THREE-DIMENSIONAL SURFACE OF TUBULAR ORGANS

(71) Applicant: King's College London, London (GB)

(72) Inventors: Hongbin Liu, London (GB); George Abrahams, London (GB); Bu'hussain Hayee, London (GB)

(73) Assignee: King's College London, London (GB)

( * ) Notice: Subject to any disclaimer, the term of this patent is extended or adjusted under 35 U.S.C. 154(b) by 215 days.

(21) Appl. No.: 18/020,695

(22) PCT Filed: Aug. 10, 2021

(86) PCT No.: PCT/GB2021/052062
§ 371 (c)(1),
(2) Date: Feb. 10, 2023

(87) PCT Pub. No.: WO2022/034305
PCT Pub. Date: Feb. 17, 2022

(65) Prior Publication Data
US 2023/0267679 A1    Aug. 24, 2023

(30) Foreign Application Priority Data
Aug. 11, 2020  (GB) ..................................... 2012497

(51) Int. Cl.
*G06T 17/00*       (2006.01)
*G06T 7/579*       (2017.01)
(Continued)

(52) U.S. Cl.
CPC .............. *G06T 17/00* (2013.01); *G06T 7/579* (2017.01); *G06T 7/70* (2017.01); *G06T 15/04* (2013.01);
(Continued)

(58) Field of Classification Search
CPC ........... G06T 7/579; G06T 7/70; G06T 15/04; G06T 17/00; G06T 2207/10068;
(Continued)

(56) References Cited

U.S. PATENT DOCUMENTS 10,682,108 B1    6/2020  Ma et al.
11,191,423 B1 *  12/2021  Zingaretti ............... G06T 19/00
(Continued)

OTHER PUBLICATIONS

Masahiro Oda et al., Colon Shape Estimation Method for Colonoscope Tracking Using Recurrent Neural Networks, aiXiv: 2004.13629v1, Computer Vision and Pattern Recognition [cs.CV], Apr. 2020, pp. 1-9.*

(Continued)

Primary Examiner — Jacinta M Crawford
(74) Attorney, Agent, or Firm — Banner & Witcoff, Ltd.

(57) ABSTRACT

A method of visualising the three-dimensional internal surface of a lumen in real-time comprising using various combinations of image, motion and shape data obtained from an endoscope with a trained neural network and a curved lumen model. The three-dimensional internal surface may be unfolded to form a two-dimensional visualisation.

18 Claims, 25 Drawing Sheets

(51) Int. Cl.
*G06T 7/70* (2017.01)
*G06T 15/04* (2011.01)

(52) U.S. Cl.
CPC .............. *G06T 2207/10068* (2013.01); *G06T 2207/30092* (2013.01); *G06T 2207/30244* (2013.01); *G06T 2210/41* (2013.01)

(58) Field of Classification Search
CPC . G06T 2207/30092; G06T 2207/30244; G06T 2210/41; G06N 3/02; G06N 3/08
USPC .......................................................... 345/419
See application file for complete search history.

(56) References Cited

U.S. PATENT DOCUMENTS

| | | | | |
|---|---|---|---|---|
| 12,217,449 | B2* | 2/2025 | Rivlin | ................ A61B 5/4255 |
| 2020/0077905 | A1* | 3/2020 | Melanson | .......... A61B 17/3478 |
| 2020/0100658 | A1* | 4/2020 | Abbott | ................ A61B 1/0051 |
| 2020/0219272 | A1 | 7/2020 | Pizer et al. | |
| 2020/0237198 | A1 | 7/2020 | Liu et al. | |
| 2020/0286225 | A1* | 9/2020 | Ben-Haim | .............. G06T 19/00 |
| 2021/0280312 | A1* | 9/2021 | Freedman | .............. G16H 30/40 |

OTHER PUBLICATIONS

Jan. 14, 2021—(GB) Search Report—GB2012497.0.
Nov. 4, 2021—(WO) International Search Report and Written Opinion—PCT/GB2021/052062.
Armin Mohammad Ali et al., "Learning Colon Centreline from optical colonoscopy, a new way to generate a map of the Internal colon surface", Healthcare Technology Letters, vol. 6, No. 6, pp. 187-190, Jan. 1, 2019.
Armin Mohammad Ali et al., "Visibility Map: A New Method in Evaluation Quality of Optical Colonoscopy", Springer International Publishing, pp. 396-404, 2015.
Zhou Jin et al., "Circular Generalized Cylinder Fitting for 3D Reconstruction in Endoscopic Imaging Based on MRF", IEEE Computer Society Conference, pp. 1-8, Jun. 2, 20083.

* cited by examiner

- ○--▶ Camera ray
- ✕ Point cloud
- ○ Projected point
- ◀—▶ Reprojection error

- ○---▶ Camera ray
- —·—·— Optical axis
- φ Viewing angle
- |r| Ray length
- ✱ 1st intersection Condition 1 (Field of view)

Condition 2 (Viewing distance)

Condition 3 (Occlusion)

METHOD AND SYSTEM FOR RECONSTRUCTING THE THREE-DIMENSIONAL SURFACE OF TUBULAR ORGANS

CROSS-REFERENCE TO RELATED APPLICATIONS

This application is a U.S. National Stage application under 35 U.S.C. § 371 of International Application PCT/GB2021/052062, filed Aug. 10, 2021, which claims the benefit of priority to United Kingdom Patent Application GB 2012497.0, filed Aug. 11, 2020. Benefit of the filing date of each of these prior applications is hereby claimed. Each of these prior applications are hereby incorporated by reference in their entirety.

TECHNICAL FIELD

Embodiments of the present invention described herein relate to methods and systems for reconstructing the three-dimensional surface of tubular organs. In particular, methods and systems for reconstructing the three-dimensional internal surface of the colon comprising using shape data from a flexible endoscope system, and pose data from the endoscope camera, and fitting the data to a curved lumen model to obtain a model of the internal surface.

BACKGROUND TO THE INVENTION AND PRIOR ART

Of worldwide cancer deaths, colorectal cancer has the second highest mortality rate. The early detection and removal of cancerous or precancerous polyps, both of which can be carried out non-invasively with colonoscopy screening, substantially reduces the risk of mortality. However, the procedure is imperfect with research showing that only 81% of colon mucosa is inspected even under optimal conditions. This in part causes 2-6% of cancers, 5-10% of 'advanced' (benign, >10 mm) adenomas, and up to 22% of small adenomas to be missed during colonoscopy. At present, adenoma detection rate (ADR) is a key internationally recognised quality assurance marker for colonoscopist performance, however this is only a surrogate marker for the proportion of the colon mucosa seen. The latter is clearly the true quality indicator but up to now there has been no reliable method to calculate this and even more so in real-time.

Intra-procedural ('real-time') support to ensure adequate visualisation could be used to guide clinicians and ensure good visualisation and practice. After the procedure, a metric derived from this data could provide post-procedural quality assurance and training.

Furthermore, there is a clear, pressing need for technology which can produce a digitized map of the colon on which the locations of tissue abnormalities and unseen areas can be indicated. Such information could provide significant improvements for the detection and accurate localisation of cancers. However, reconstructing the colon's internal surface has proven to be extremely challenging by imaging alone and there remains no practical solution available. This is partly due to the high complexity of the organ and partly due to the lack of space within endoscopes to accommodate either binocular vision or light-based three-dimensional sensors.

Analogous to simultaneous localization and mapping (SLAM) for mobile robots, accurate mapping of the colon will also require the motion of the endoscope to be fused with information from the camera. Robot-assisted technology is well-positioned to provide this information. In addition, while traditional endoscopy causes significant distortion to the colon making registration challenging, self-propelled endoscopes avoid this making the problem tractable. An example of such an endoscope can be found in King's College London's patent application WO2018154326. FIG. 6 illustrates an example of the device. See also references [1] and [2].

Improving Amount of Mucosa Seen

In esophagogastroduodenoscopy (EGD) or upper endoscopy, WISENSE monitors for blind spots by using a convolutional neural network (CNN) to document in real-time which of the 26 required endoscopic views have been obtained [3]. This is technologically relatively easy as the stomach is homogenous among patients, has a clear beginning and end, and lacks deep occluding folds—hence each of the views are easy to identify repeatably. A 300-participant study showed that this real-time feedback decreased the number of blind spots from 22% to 6%. This approach is not possible for colonoscopy as most locations cannot be anatomically distinguished from the endoscopic image. For colonoscopy, two classes of method exist for estimating the amount of mucosa seen.

The first class of methods measure and encourage the endoscope to be withdrawn in a spiral fashion as this should approximately cover the full mucosa. A group at the University of Minnesota measured the effect of real-time feedback from this method over 350 trainee colonoscopies and showed statistically significant improvements in these features due to the real-time feedback of the spiral indicator [4].

The second class of methods from the same group reconstructs a three-dimensional model from two-dimensional views, extrapolating for unseen parts of the colon such as those behind folds [5]. A color-coded graphical depiction can then indicate areas likely missed and the endoscopist has the option to go back and focus on these areas. Their method requires compute intensive algorithms, maxing out at 4 Hz, and assumes that the shape is essentially cylindrical with folds (haustra). The method has not yet been tested in clinical practice.

Three-Dimensional Reconstruction

To produce a method that falls into the second class for measuring the amount of colon mucosa seen as above, a three-dimensional interpretation of the endoscopic image is required. Numerous efforts have been made to this effect.

Multi-View Stereo (MVS) methods, such as Shape from Motion (SfM), are well-established techniques for reconstructing an object or scene's shape from multiple monocular images. However, due to a lack of distinct features to track in the colon, reconstructions using MVS are typically sparse, leading to inaccuracies and providing little information to, for example, accurately register frames.

Recent research has focused on dense depth estimation techniques in order to address this lack of features. These methods create a depth map in which the intensity of every pixel relates to the distance to that three-dimensional location. These methods focus on high pixel-by-pixel accuracy, for example for measuring polyp size, as opposed to approximating the overall structure of the colon. As a by-product of this focus on pixel accuracy, depth maps model only what is seen and are unable to predict if areas of tissue are missed or approximate the geometry of those missed areas. Shape from Shading (SfS) is a prominent technique which estimates the relationship between appearance and depth by modelling the lighting conditions of a scene, either explicitly or implicitly as with a neural network. A limitation of SfS as applied to colonoscopy is that the real-world lighting and tissue reflectance properties vary throughout the organ and are therefore impossible to model fully. This leads to noisy and inaccurate data from errors such as the misinterpretation of shadows or reflections.

Another approach to colon mapping is based upon pipe projection for mosaicking videos in which the camera is moving forward through an approximately cylindrical scene. The technique maps the tissue's surface onto a virtual cylindrical model. Variations of this method have been widely applied to Wireless Capsule Endoscopy (WCE) of the small intestine. However, the geometry of the colon is significantly more complex with sharp bends and haustral folds being located along its length, making many of the assumptions used by the cylindrical model invalid. In particular, the principal limitation for the colon is its inability to handle curvature—an assumption which will not hold for the vast majority of frames. Despite this, it has been attempted by one author [6].

The more complex Circular Generalized Cylinder (CGC) was presented in [7] which, although similar to the pipe projection models, constructs geometry from a number of successive circles positioned at a fixed distance from one another so as to form the cross-sectional skeleton of the organ. A similar concept was investigated in [5] specifically for colonoscopy in which the distance to and angle of each of the haustral folds is estimated before undergoing interpolation. A major limitation of this work is that it is highly complex and hence infeasible for real-time application and likely to fail in less ideal images. Additionally, the algorithm lacks input when not looking straight down the colon lumen as no folds are seen.

Virtual Unfolding

There has been extensive research into producing unfolded maps of the colon's internal surface from the three-dimensional data obtained in virtual (CT) colonoscopy in order to improve screening. The most popular technique is known as conformal mapping, which distorts the 3D geometry onto a 2D plane while preserving the angles of the local geometry, as with the Mercator world map projection. However, this has not been extended to traditional colonoscopy due to the lack of information from optical video and the increased complexity of processing. One exception is [6], however the methods proposed are extremely limited, working only for a tiny fraction of unsimulated video sequences. Optical colonoscopy remains the gold standard of colon screening as tissue colour and texture is visible and immediate intervention is possible when polyps are discovered. Similar mapping systems have been researched for other simpler organs such as the oesophagus, but the colon remains by far the most challenging.

SUMMARY OF THE INVENTION

Embodiments of the present invention address the above problem, by providing methods and systems for reconstruction of the three-dimensional internal surface of the colon, and a method and system for unfolding a three-dimensional model to produce a two-dimensional map of the internal surface.

Some aspects of the invention described herein comprise a holistic approach to map the internal surface (mucosa) of the colon on which 'missed' (i.e. unseen) areas of tissue are marked to aid diagnosis during optical colonoscopy. The invention may use a curved tubular model to approximately reconstruct the colon's geometry. Sensor information may be provided by a soft robotic endoscope, such as that described in the Applicant's prior patent application WO2018154326, and known as MorphGI, such as the camera's pose ('pose data'), and the curvature of the colon's central axis ('shape data') is used to fit the model to the endoscope's camera image ('image data'). The model may then be virtually unfolded to produce a rectangular image of the colon's mucosa. This image can be used intraoperatively or post-operatively.

In view of the above, from a first aspect, the present disclosure relates to a method for visualising a three-dimensional internal surface of a region of interest in a lumen. The method comprises the steps of: collecting image data from a camera mounted on an endoscope moving through the region of interest; collecting motion data in relation to the motion of the endoscope; collecting endoscope shape data in relation to the shape of the endoscope; inputting the image data into an algorithm, such as a machine learning algorithm, e.g. a neural network, to output pose data of the camera relative to the lumen; and inputting the pose data, the motion data and the endoscope shape data into a model to virtually construct a three-dimensional model of the internal surface of the region of interest.

This aspect provides a method for combining image, motion and shape data from an endoscope inserted into a lumen to generate a three-dimensional model of the internal surface of the lumen. This is achieved by inputting at least the image data (which may comprise a plurality of frames from a video) into an algorithm (e.g. a trained neural network) to obtain estimates of the camera pose for each image frame. The pose data, motion data and shape data are then input into a model to virtually construct the internal surface of the lumen.

The advantage of this aspect is that combining the image and shape data gives a more accurate result than just using image data alone. Shape sensing does not require a complex semantic understanding of the scene, unlike image processing, and so is more reliable. Shape sensing can be achieved using either optical, mechanical or electromagnetic shape sensing, meaning that a specially adapted endoscope is not necessary for this method.

In a second aspect of the invention, there is provided a complementary or alternative method for visualising a three-dimensional internal surface of a region of interest in a lumen. The method comprises: collecting image data from a camera mounted on an endoscope moving through the region of interest, the image data comprising a plurality of frames; inputting the plurality of frames into an algorithm trained to determine camera pose and lumen curvature from input image data, and obtaining pose data of the camera relative to the lumen corresponding to each frame and image shape data corresponding to the lumen curvature; inputting the pose data and the image shape data into a curved lumen model; outputting a plurality of three-dimensional models of the internal surface of the lumen, each model corresponding to each frame; combining the plurality of three-dimensional models to obtain a final three-dimensional model of the internal surface of the region of interest.

This aspect provides a method which uses image frames from a video taken by an endoscope inserted into a lumen, and inputs those frames into a trained neural network to obtain estimates of the pose of the camera for each image frame. The pose information is then input into a curved lumen model—a model which may assume a constant curvature for the region of interest. This model outputs a three-dimensional model of the internal surface of the lumen. It is not essential that the plurality of models be combined, optionally the individual models can be used alone to provide information of what can and cannot be seen at that instant. This aspect is advantageous as it only requires image data to generate the three-dimensional model. The trained neural network can obtain enough information from the image data alone to provide sufficient inputs into the curved lumen model. The curved lumen model is advantageous over previous work using cylindrical models, as assumptions used by the cylindrical model are not valid for all lumens. For example, cylindrical models do not work well for the colon. Analysed CT data from 12 virtual colonoscopies found that the median angle of a 5 cm segment of colon is 60° and 10% of segments have an angle of above 120°, as shown in FIG. 19.

A method according to the second aspect of the invention may further comprise: collecting endoscope shape data in relation to the shape of the endoscope, which is related to the shape of the lumen; and inputting the endoscope shape data into the curved lumen model as an additional input. This is advantageous as having endoscope shape data in addition to image shape data provides more information to the model, increasing the accuracy of the model.

A method according to either of the above described aspects may further comprise using the endoscope shape data as an additional input into the neural network. This is advantageous as providing the neural network with more information increases the accuracy of the neural network's outputs, and therefore the model's inputs.

The endoscope shape data may be obtained using mechanical sensing or electromagnetic sensing. This is advantageous as this means that standard endoscopes can be used with this method without requiring modification. Endoscopes with electromagnetic sensing are common in the field. Mechanical sensing is advantageous as mechanical sensing and modelling is simple and reliable and does not require any sensors external to the endoscope.

The endoscope shape data may be corrected for spatial offset from the image data. Spatial offset between the endoscope shape data and the image data may arise due to the fact that while the camera perceives the location in front of the robot, the shape sensing perceives the current location of the robot. The image data and endoscope shape data can be synchronised by identifying what endoscope shape data corresponds to what image data. Temporal offset between the endoscope shape data and the image data may arise due to the potential for the colon's shape to change over time as a result of mechanical interaction with the endoscope. For soft endoscopes, this is not an issue as soft endoscopes conform to the shape of the colon, so the colon is not deformed as the endoscope moves through it. In contrast, traditional endoscopes tend to deform the colon as they move through it, although this is much more significant during cecal intubation rather than withdrawal. For this reason, the temporal offset is assumed to be negligible for both class of endoscopes, however, soft endoscopes are particularly well-suited for this assumption.

The endoscope shape data and/or the image shape data may comprise information on curvature of the lumen's central axis. As the endoscope moves through the colon, the endoscope's shape will approximately follow the curvature of the lumen.

A method according to the second aspect of the invention may further comprise: collecting motion data in relation to the motion of the endoscope; and inputting the motion data into the curved lumen model as an additional input. This is advantageous as having motion data in addition to image data provides more information to the model, increasing the accuracy of the visualisation. Motion data may be used for synchronising the image and shape data (i.e. correcting for spatial offset), and/or stitching the plurality of models together, each model relating to a frame.

The motion data may comprise insertion depth data. This is advantageous as insertion depth is easy to measure using an external sensor as the endoscope is withdrawn from the lumen. The insertion depth linearly correlates to the position (and so motion) of the camera within the lumen.

The endoscope may be a flexible endoscope, which represents the current standard in gastrointestinal endoscopy and often contain electromagnetic sensors for shape measurement. This is advantageous as the invention may be applied to existing endoscopes without alteration to the endoscopes' hardware.

The flexible endoscope may be a soft robot. The soft robot may comprise one or more soft segments able to conform to a shape of the lumen. The one or more soft segments may each comprise at least one fluid actuated (e.g. hydraulically or pneumatically) internal chamber. A pressure and a volume in the at least one hydraulically actuated internal chamber may be used to sense the shape of the soft robot to provide shape data. These features are advantageous as they enable the shape of the endoscope to be sensed using intrinsic sensing. This means that no additional sensors are required to accurately sense the shape of the endoscope, limiting the cost and complexity of the robot. As mentioned above, this is also advantageous as a soft robot may be particularly flexible and so will not deform the shape of the colon as it moves, resulting in a negligible temporal offset.

The model may assume constant curvature of the region of interest. This is advantageous as previous work has assumed that the region of interest is cylindrical. However, this assumption does not work well for the colon, as the geometry of the colon is complex. A model assuming constant curvature for a given region gives much better results for modelling the colon than a cylindrical model. Previous work that has tried to more accurately model the colon has resulted in highly complex analysis which is not appropriate for real-time application. A constant curvature model strikes a balance between the overly simplistic and inaccurate cylinder model and overly complex models which are impractical. Alternatively, the curvature does not need to be constant, more complex curvatures can be inferred from the image frames processed by the neural network, or from a plurality of shape measurements over time, or by using a flexible endoscope with multiple segments for S-type curves.

The model may assume non-circular and/or varying cross-sections of the region of interest. This is advantageous as non-circular or variable cross-sections may better approximate the geometry of the lumen of interest, for example, the transverse section of the colon typically has a rounded triangular shape.

A method according to either of the above described aspects may further comprise virtually unfolding the three-dimensional model to form a two-dimensional model of the internal surface of the lumen, wherein the two-dimensional model shows the locations of blind spots where the camera cannot obtain image data. This is advantageous as it shows the endoscopist where areas have not been sufficiently scanned by the endoscope, prompting them to return and scan those areas. Further, unfolding the three-dimensional model to produce a two-dimensional map makes it far quicker and easier for the endoscopist to view the internal structure. For a three-dimensional model, the endoscopist would have to virtually 'move through' the model to assess it. Whereas, the two-dimensional model can be easily viewed in one glance.

The three-dimensional model may be updated in real-time. This is advantageous when performing an endoscopy, as if it is found that areas have been missed, the endoscopist can return to those areas immediately, rather than having to call the patient back for further tests at a later date.

The image data may be optical image data. This is advantageous as optical colonoscopy remains the gold standard of colon screening as tissue colour and texture is visible.

The lumen may be a gastrointestinal tract, preferably a colon. As described throughout, this invention is particularly useful for the colon, as its complex geometry presents challenges that the invention addresses, e.g., the colon is not approximately cylindrical, and has varying cross-sections.

The neural network may additionally output properties of the lumen to be used as additional inputs into the model. The properties of the lumen may comprise one or more of:
a magnitude of curvature in the region of interest;
a direction of curvature in the region of interest;
a length of the region of interest;
a radius of the region of interest;
one or more cross-sections of the region of interest;
one or more lengths of haustra in the region of interest; and
one or more depths of haustra in the region of interest.

This feature is advantageous, especially when shape data is not provided, as the neural network can estimate the properties required for the model from the image data.

In a third aspect of the invention, there is provided a method for detecting missing data of an internal surface of a colon. The method comprising: inputting a three-dimensional model of the internal surface into an unfolding program, the model being derived from optical image data taken by an endoscope inserted into the colon; and outputting a two-dimensional model of the internal surface of the colon. Wherein the two-dimensional model highlights areas where there is no image data available.

As described above in relation to the first and second aspects, detecting missing data and unfolding the model is advantageous as it allows the endoscopist to see which areas have not been sufficiently scanned by the endoscope, prompting them to return and scan those areas. Further, unfolding the three-dimensional model to produce a two-dimensional map makes it far quicker and easier for the endoscopist to view the internal structure. For a three-dimensional model, the endoscopist would have to virtually 'move through' the model to assess it. Whereas, the two-dimensional model can be easily viewed in one glance. However, the process of detecting missing data and unfolding the model does not necessarily have to be performed in tandem with the two-dimensional model described above, although such an arrangement is preferable.

In a fourth aspect of the invention, there is a system for visualising a three-dimensional internal surface of a region of interest in a lumen. The system comprises a processor and a memory including computer program code. The memory and the computer program code are configured to, with the processor, perform a method according to of any of the aspects described above.

The system described above may further comprise an endoscope arranged to provide one or more of image data, shape data and motion data to the memory.

In a fifth aspect of the invention, there is a system for detecting missing data of an internal surface of a colon. The system comprises a processor and a memory including computer program code. The memory and the computer program code are configured to, with the processor, perform a method according to the third aspect described above.

A yet further aspect of the invention comprises a computer-implemented system for modelling an in vivo lumen of a subject, the system comprising: at least one processor; and at least one computer readable storage medium storing computer readable instructions that when executed by the processor cause the processor to: i) receive endoscope motion data, endoscope image data, and endoscope shape data obtained from within the in vivo lumen of a subject during an endoscopic examination of the lumen; ii) process the endoscope motion data, endoscope image data, and endoscope shape data to determine a virtual three dimensional model of the lumen, the virtual three dimensional model of the lumen being formed by a series of contiguous curved cylinder models derived on a per image frame basis of the endoscopic image data, the virtual three dimensional model of the lumen being texture mapped where possible with the endoscope image data in dependence on a field of view of the endoscope and the resulting endoscope image data available.

Within the above, the computer readable instructions may, when executed by the processor, further cause the processor to:
iii) generate a two dimensional image of the virtual internal surface of the virtual three dimensional model by virtually unfolding the contiguous curved cylinder models into a two dimensional image, the texture mapping of the endoscope image data being transformed from the virtual three dimensional model space to the two dimensional image space where available;
wherein the virtual unfolding and endoscope image data is such that where there is insufficient endoscope image data texture mapped onto the virtual three dimensional model to populate fully the two dimensional image then the unpopulated portions of the two dimensional image are textured in such a manner as to be apparent to the user as being unpopulated, wherein the unpopulated image portions of the image show those part of the surface of the lumen that were not imaged in the endoscope image data.

BRIEF DESCRIPTION OF THE DRAWINGS

Embodiments of the invention will now be further described by way of example only and with reference to the accompanying drawings, wherein like reference numerals refer to like parts, and wherein:

FIG. 13 (right) is an illustration of a variable radius cross-section approximating the haustral folds of the colon;

DESCRIPTION OF THE EMBODIMENTS

Overview

Embodiments of the present invention are used to visualise the internal surface of a lumen, in vivo. An endoscope is inserted into the lumen of interest (e.g. the colon), and as the endoscope is slowly withdrawn from the lumen, a series of images (optionally in the form of a video) of the forward-facing field of view are taken. Each image is then used as an input into a trained neural network which can take an image and output pose data (the position and orientation of the camera at the time of the image). A program then takes the pose data (and optionally additional properties of the lumen determined from the neural network and/or determined from shape sensing in the endoscope itself) and predicts the shape of the lumen at the position where the image was taken, with the shape of the lumen being modelled as a section of curved tube. This is then repeated for all of the images in the series, such that the three-dimensional structure of an entire length of lumen of interest can be modelled and visualised. Once the three-dimensional structure is modelled, the model can be 'unfolded' to form a visualisation in the form of a two-dimensional map of the internal structure of the lumen. On this map, areas which have not been imaged by the endoscope can be highlighted to allow the endoscopist to return to those areas and ensure they are imaged. Additionally or alternatively, the areas which have not been imaged by the endoscope may be highlighted on the three-dimensional model.

Figure 1:
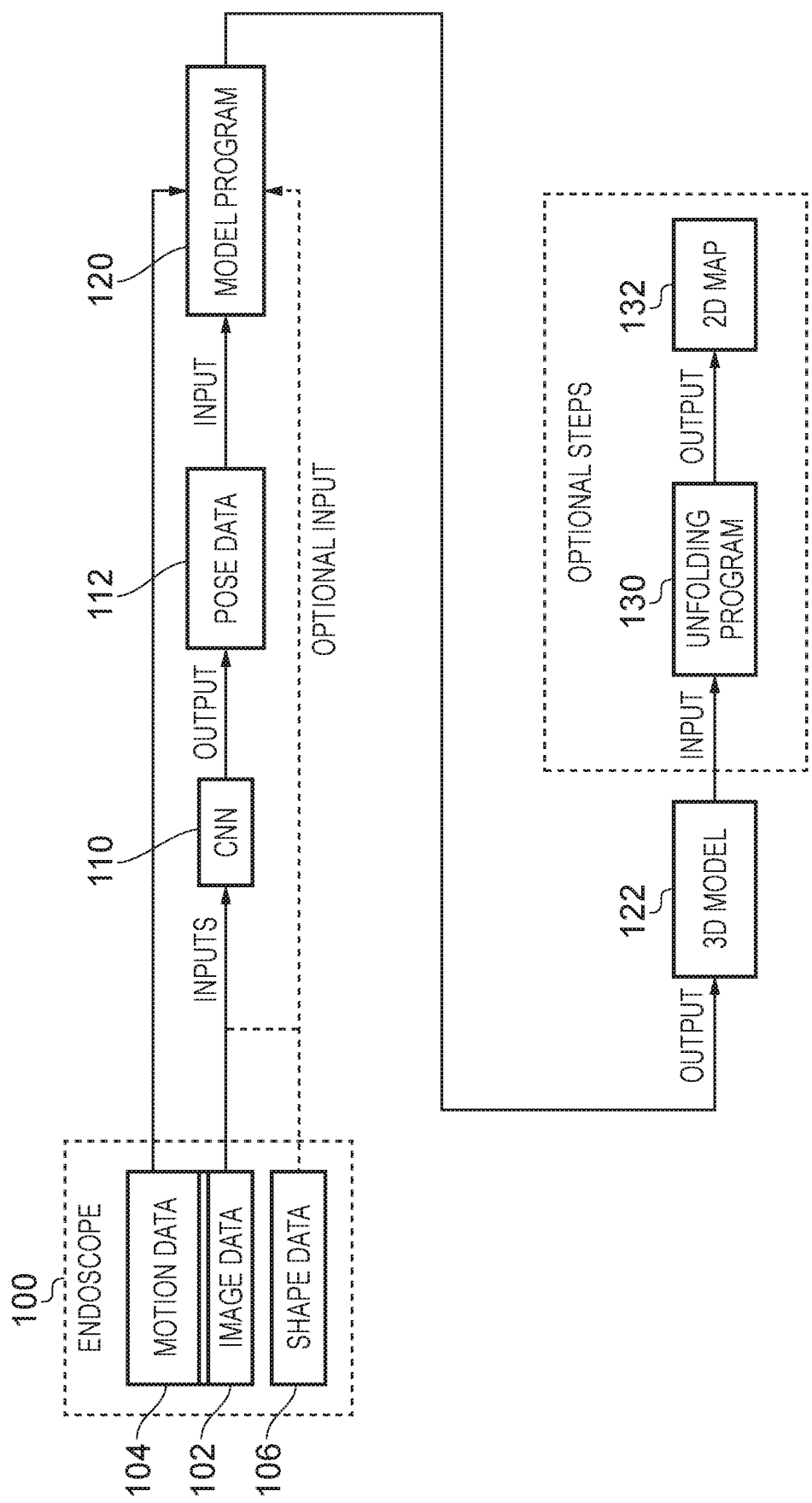
FIG. 1 is a flow diagram according to a first embodiment of the present invention.

FIG. 1 illustrates one embodiment of the present invention. An endoscope 100 inserted within the lumen of interest collects image data 102, motion data 104 and shape data 106. The image data 102 comprises a plurality of snapshots of the forward-facing field of view of the endoscope's camera as the endoscope 100 is withdrawn from the lumen. The motion data 104 may comprise the insertion depth of the endoscope 100, which decreases with time as the endoscope 100 is withdrawn. The insertion depth may be measured external to the endoscope 100. The insertion depth is related to the camera position within the lumen. The shape data 106 may be collected from shape sensors on the endoscope 100 itself—this may be achieved using electromagnetic sensors (if the endoscope is a traditional endoscope) or mechanical shape sensing (if the endoscope is a soft robot, such as described in WO2018154326).

The image data 102, and optionally the shape data 106 are then used as inputs into a trained convolutional neural network (CNN) 110. The neural network 110 can analyse the data inputs 102, 106 to compute what the position and orientation (pose data 112) of the endoscope's camera was at the time when each individual image was taken.

Figure 2:
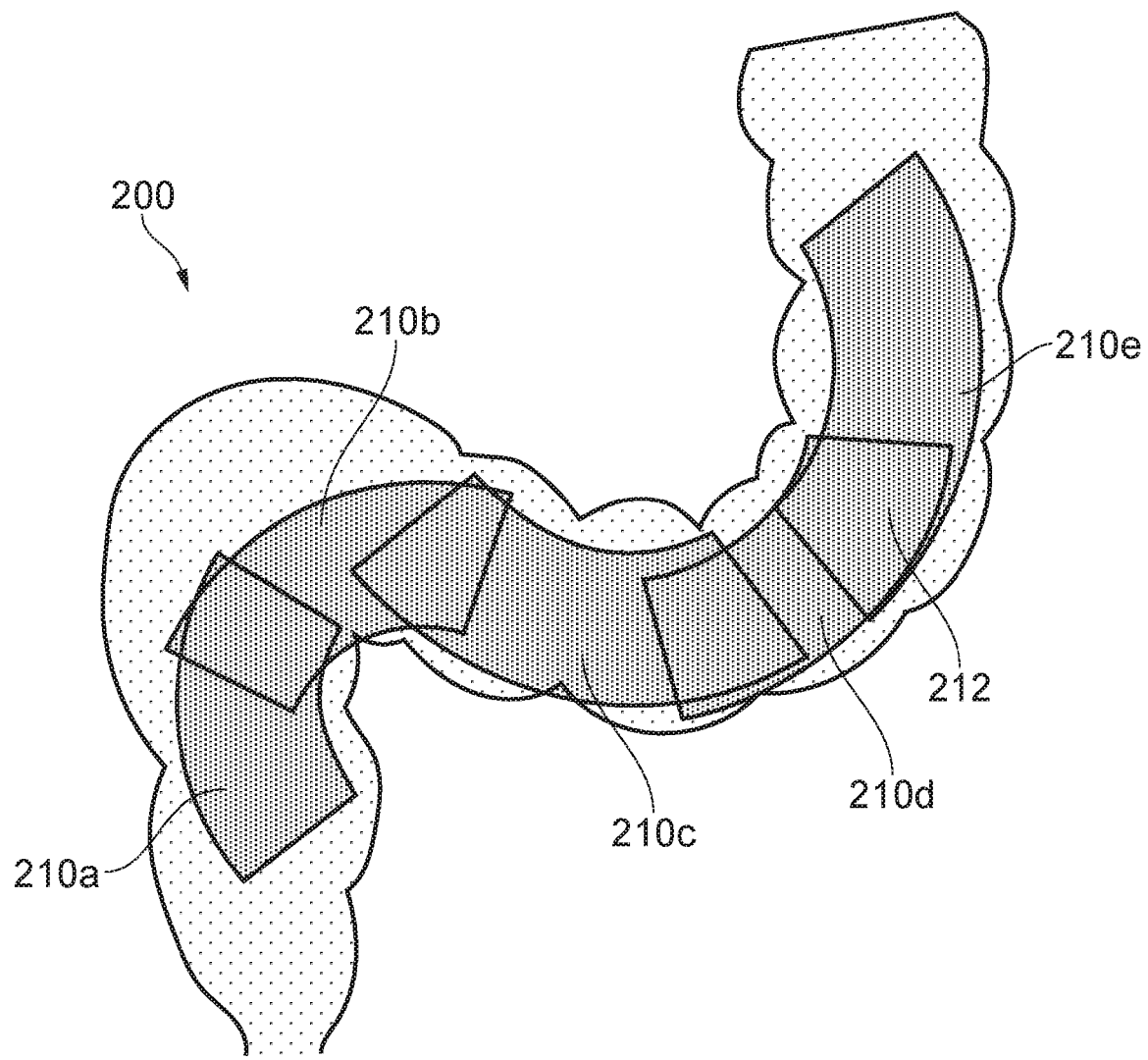
FIG. 2 is a diagram showing multiple torus models corresponding to multiple image frames in the lumen of interest.

The pose data 112, the motion data 104, and optionally the shape data 106 in relation to each image can then be used as inputs into a program 120 for modelling the three-dimensional structure of the lumen. The shape data 106 may be used to estimate additional parameters required by the model—namely the magnitude and direction of constant curvature, and the length and radius of the section of the lumen to be modelled. The program outputs a prediction of a section of the lumen for each image. This is illustrated in FIG. 2. These predictions 210a-e are in the form of a curved torus segment. Therefore, each image frame has a corresponding prediction 210a-e for the section of lumen 200 relating to that frame. The plurality of predictions 210a-e may then be combined to form a complete model of the portion of the lumen traversed by the endoscope. However, it is not essential for the predictions from each frame to be combined. Each prediction by itself can still provide information of what can and cannot be seen at that very point. When combining the plurality of predictions, the curved torus segments overlap (e.g. 212). This overlap 212 increases the accuracy of the complete model, as it has multiple sources of information for those overlapped sections 212. The end result of the modelling program (described in more detail below) is a three-dimensional model 122 of the lumen.

The three-dimensional model 122 may then be unfolded using an unfolding program 130, resulting in a two-dimensional map 132 of the internal surface of the lumen 200. The two-dimensional map 132 enables the prediction of any "blind spots"—i.e. areas which are likely to have been missed by the endoscope camera during the screening process. This then allows the endoscopist to return to these locations and image them separately. A further advantage of the two-dimensional map 132 is the ease of viewing. It is much easier to quickly view a two-dimensional image than it is to virtually move through a three-dimensional visualisation of the lumen 200.

Figure 3:
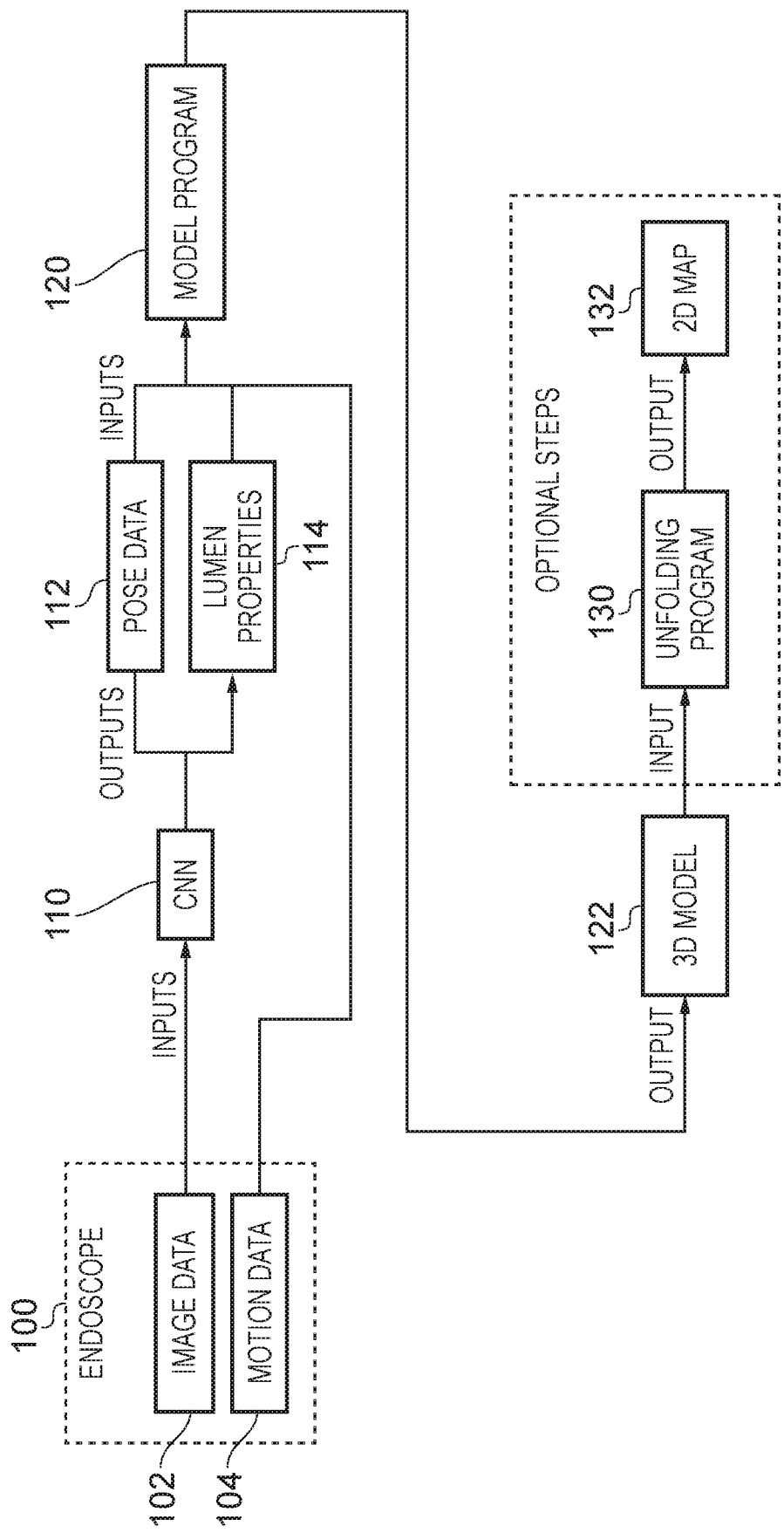
FIG. 3 is a flow diagram according to a second embodiment of the present invention.

FIG. 3 illustrates a further embodiment of the present invention. This embodiment is similar to the embodiment described above and illustrated in FIG. 1, except there is no endoscope shape data 106 involved. In this embodiment, the endoscope may only collect image 102 data. The image data 102 is then used to estimate the shape of the lumen. The image data 102 is used as an input for the neural network 110. The neural network 110 outputs pose data 112 as above, and additionally outputs estimates of the lumen properties 114 required for the model 120 (such as the magnitude and direction of constant curvature, the length and radius, the cross-section, and properties of the haustra of the section of the lumen to be modelled). The model 120 then proceeds as described above. In this embodiment, motion data 104 may also be collected by the endoscope and used to provide additional information to stitch frames together in the model program 120.

Figure 4:
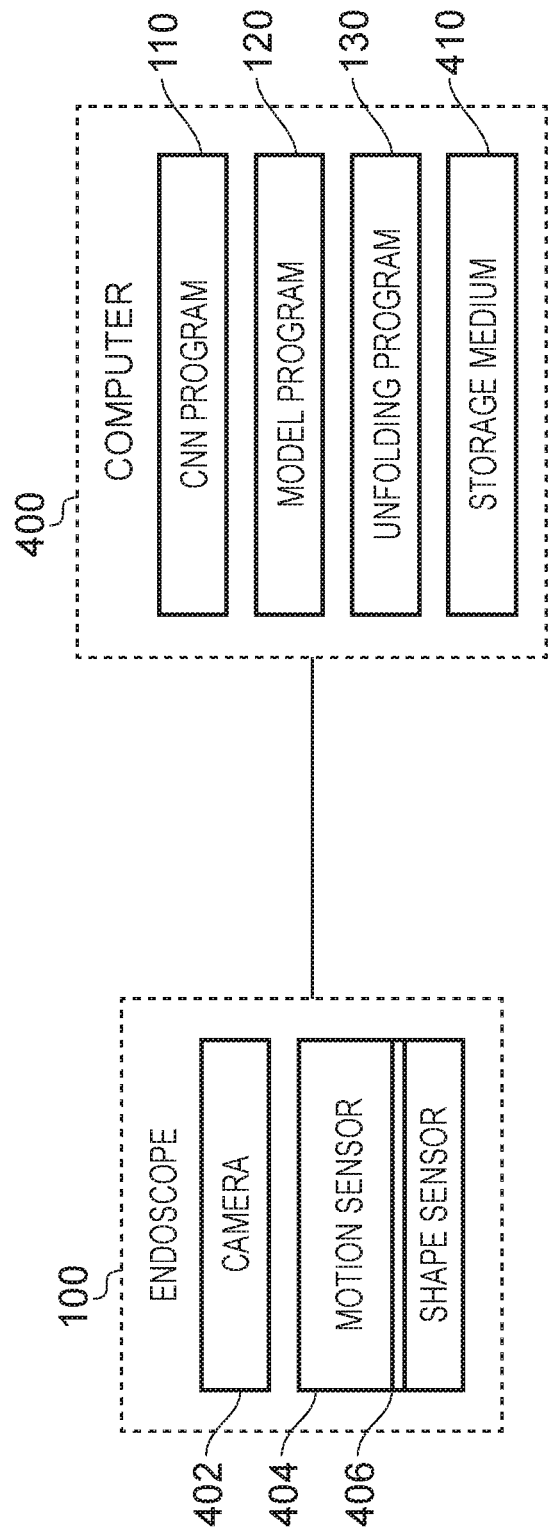
FIG. 4 is a block diagram of the endoscope and computer according to an embodiment of the present invention.

FIG. 4 shows how the endoscope 100 may comprise a camera 402 to collect the image data 102, a motion sensor 404 to collect the motion data 104 and a shape sensor 406 to collect the shape data 106. Optionally, the motion sensor 404 may be located externally to the endoscope 100, such that it can measure the insertion depth of the endoscope 100. The shape sensor 406 may be a mechanical shape sensor (for example, in the case of a soft endoscope) or an electromagnetic shape sensor (for example, in the case of a traditional endoscope). It will be apparent to the skilled person that shape sensors based upon other principles could be used, for example, optical shape sensing. An electromagnetic shape sensor may comprise a series of magnetic rings around the endoscope—these are known in the art. The computer 400 comprises a trained convolutional neural network 110, a model program 120 to visualise the internal structure in three-dimensional, an unfolding program 130 to unfold the three-dimensional model 122 to a two-dimensional map 132, and optionally a storage medium 410. The computer system 400 is shown in more detail in FIG. 5.

Figure 5:
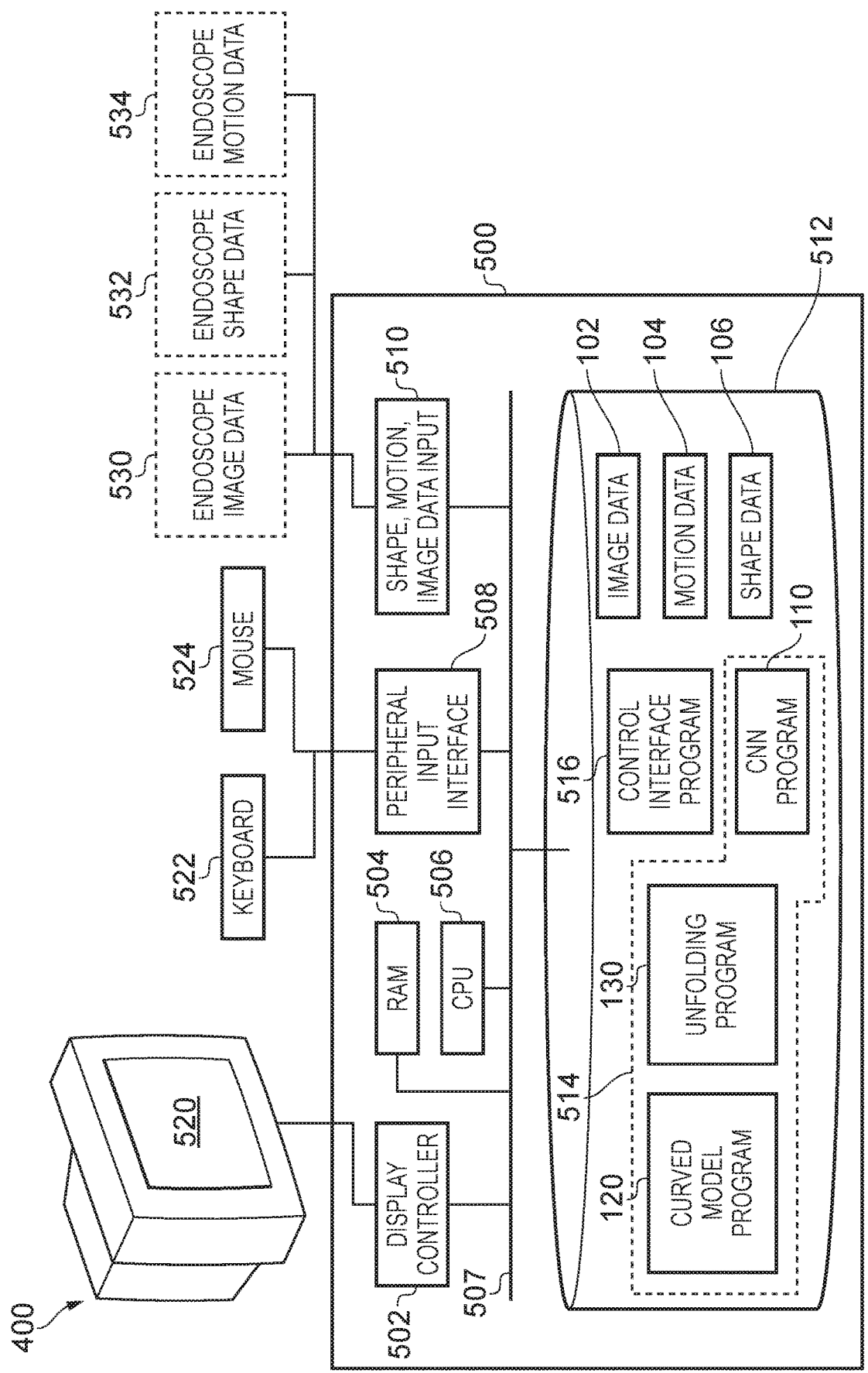
FIG. 5 is a block diagram of a system according to an embodiment of the present invention.

FIG. 5 is a block diagram illustrating an arrangement of a system according to an embodiment of the present invention. Some embodiments of the present invention are designed to run on general purpose desktop or laptop computers. Therefore, according to a first embodiment, a computing apparatus 500 is provided having a central processing unit (CPU) 506, and random access memory (RAM) 504 into which data, program instructions, and the like can be stored and accessed by the CPU. The apparatus 500 is provided with a display screen 520, and input peripherals in the form of a keyboard 522, and mouse 524. Keyboard 522, and mouse 524 communicate with the apparatus 500 via a peripheral input interface 508. Similarly, a display controller 502 is provided to control display 520, so as to cause it to display images under the control of CPU 506. Endoscope image 530, shape 532 and motion data 534, can be input into the apparatus and stored via shape, motion and image data input 510. In this respect, apparatus 500 comprises a computer readable storage medium 512, such as a hard disk drive, writable CD or DVD drive, zip drive, solid state drive, USB drive or the like, upon which image data 102, motion data 104, and shape data 106 can be stored. Alternatively, the data 530, 532, 534 could be stored on a web-based platform, e.g. a database (e.g. XNAT), and accessed via an appropriate network. Computer readable storage medium 512 also stores various programs, which when executed by the CPU 506 cause the apparatus 500 to operate in accordance with some embodiments of the present invention.

In particular, a control interface program 516 is provided, which when executed by the CPU 506 provides overall control of the computing apparatus, and in particular provides a graphical interface on the display 520, and accepts user inputs using the keyboard 522 and mouse 524 by the peripheral interface 508. The control interface program 516 also calls, when necessary, other programs to perform specific processing actions when required. In particular, a trained convolutional neural network program 110 is provided which is able to operate on one or more of data 102, 106 indicated by the control interface program 516, so as to output pose data (not shown) and optionally estimates of lumen properties required for the model program. These outputs are then used in the curved model program 120 to produce a three-dimensional model of the internal structure of the lumen. This three-dimensional model may then be input into an unfolding program 130 to produce a two-dimensional map of the internal structure. The operations of the convolutional neural network program 110, curved model program 120 and unfolding program 130 are described in more detail below.

The detailed operation of the computing apparatus 500 will now be described. Firstly, the user launches the control interface program 516. The control interface program 516 is loaded into RAM 504 and is executed by the CPU 506. The user then launches a visualisation program 514, which is comprised of the neural network program 110, the curved model program 120 and the unfolding program 130. The programs act on the input data 102, 104, 106 as described above.

Obtaining the Data

Figure 6:
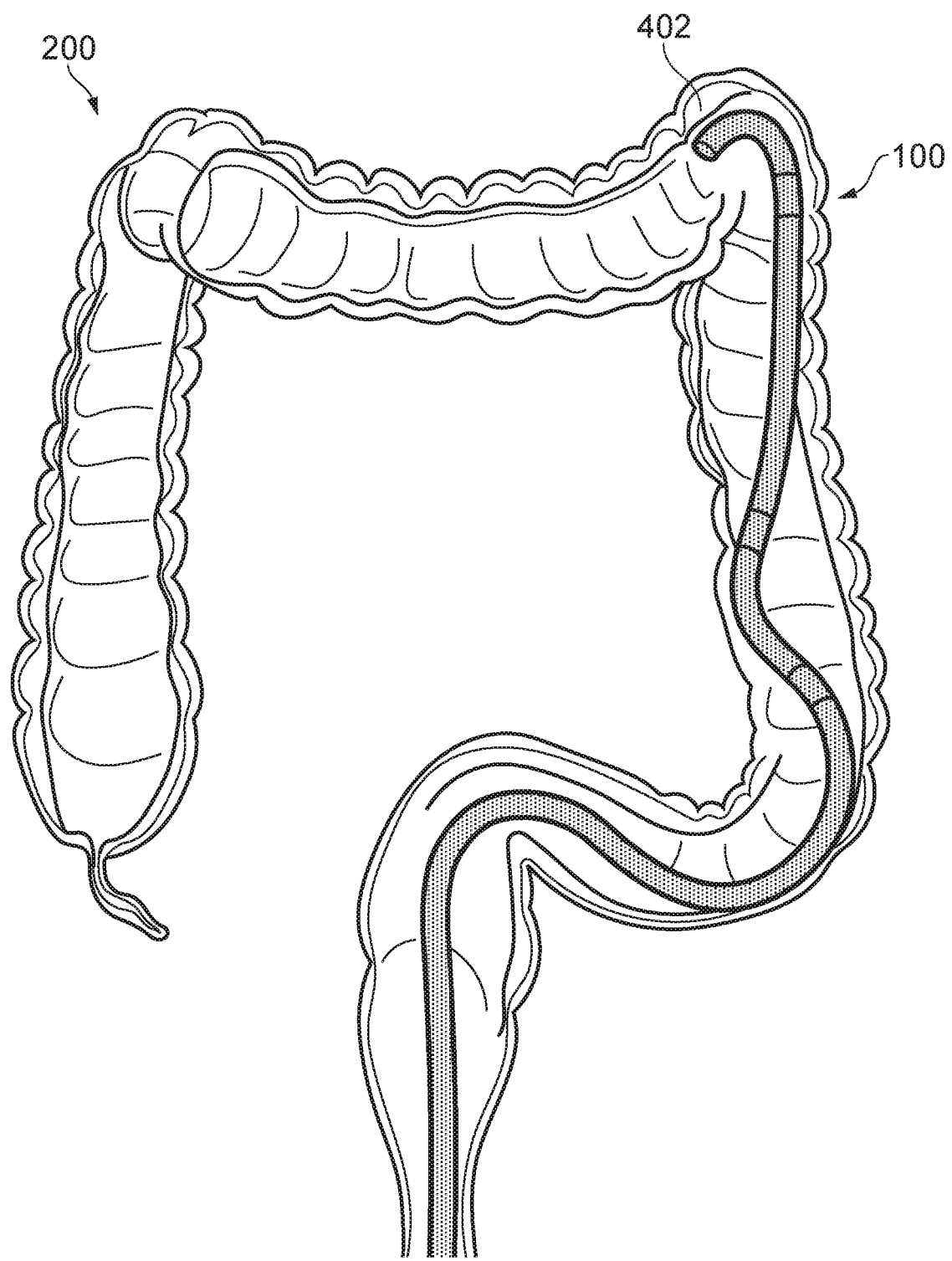
FIG. 6 is a CGI image of a flexible, self-propelled robotic colonoscope which could be used with the present invention.
Figure 7:
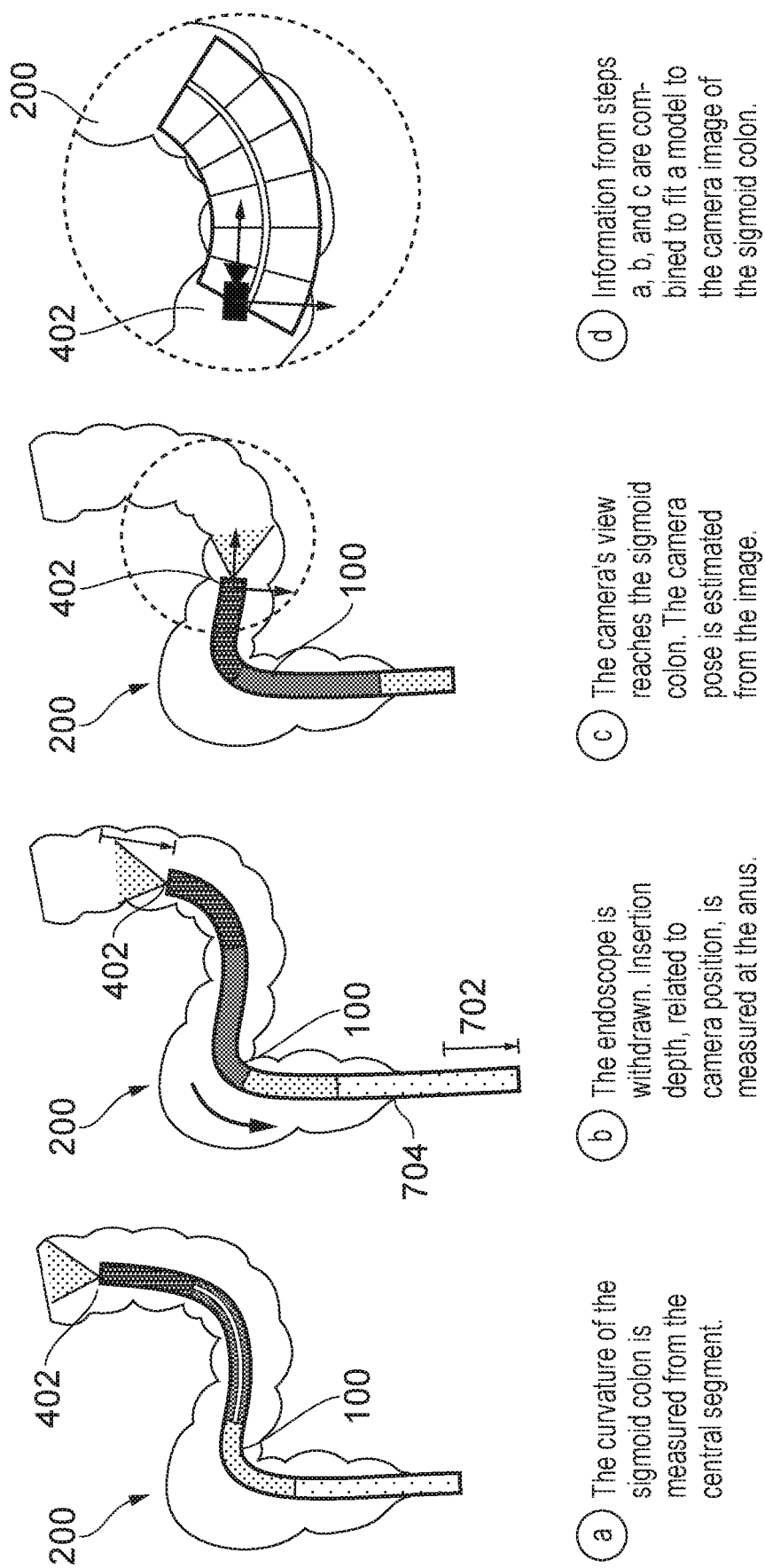
FIG. 7 is a diagram showing the steps for combining shape sensing, insertion depth and the camera image to fit the colon model.

The endoscope 100 is inserted into the lumen of interest 200, for example, the colon (although it will be obvious to the skilled person that this method could be applied to other lumens). FIG. 6 illustrates an example of an endoscope device 100 being inserted into the colon 200. The example in FIG. 6 is a highly flexible, self-propelled robotic colonoscope known as "MorphGI", of a type as described in WO2018154326, however, any endoscope suitable for the lumen of interest 200 could be used. The endoscope 100 comprises a camera 400 able to obtain image data of the forward-facing field of view while the endoscope 100 is being withdrawn from the colon 200. FIG. 7 illustrates how image data 102, motion data 104 and shape data 106 are obtained. FIG. 7 illustrates the example of the flexible soft robot. FIG. 7a shows how, in the case of a soft robot, the curvature (shape) of the colon 200 can be measured intrinsically using the robot itself (described in more detail below). The part of the method illustrated in FIG. 7a measures the magnitude and direction of colon curvature. When used with the MorphGI, the soft properties of the MorphGI mean that it naturally conforms to the colon 200, matching its shape. Hence, by measuring the shape of the robot the shape of the colon 200 is indirectly measured. Both the shape sensing and colon models are curved, this allows mapping of the curvature information from the robot's shape to its camera 402 image. If using a traditional endoscope, electromagnetic sensing can be used to measure the shape of the endoscope. The electromagnetic sensing may use electromagnetic rings around the endoscope to monitor its shape. Electromagnetic sensing for traditional endoscopes is known in the art. FIG. 7b shows how motion data is obtained from the endoscope 100. As the endoscope 100 is withdrawn from the colon 200, the insertion depth 702 is measured at the anus 704 of the patient. This insertion depth measurement 702 linearly correlates to the camera 402 position inside the colon 200 and so can be used to determine the motion of the camera 402. FIG. 7c shows how the camera 402 obtains image data of the forward-facing field of view as the endoscope is gradually withdrawn. The images enable the camera's pose to be estimated using the trained neural network (described in more detail below). FIG. 7d shows that the shape, motion and image data are combined to fit a model (described in more detail below). The process outlined here and in FIG. 7 happens continuously, for every frame of the video.

Figure 8:
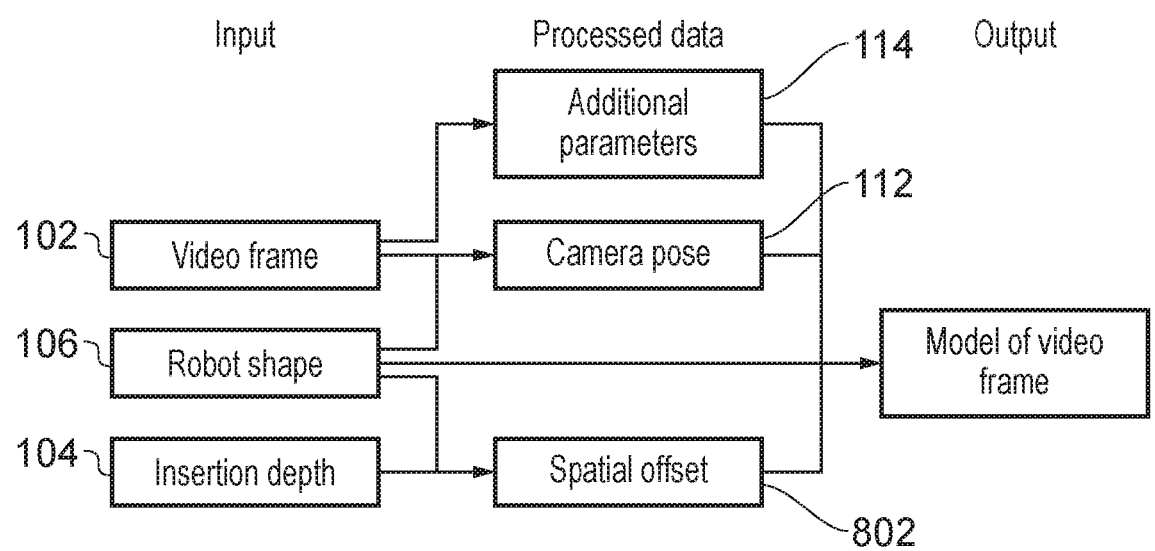
FIG. 8 is a flow diagram showing the process combining inputs from three sensors to fit the colon model to the current video frame.

FIG. 8 illustrates how the image data 102 (video frame), shape data 106 (robot shape) and motion data 104 (insertion depth) may be processed and combined, in part by using convolutional neural networks (CNN) to estimate the remaining model parameters 114 from the camera image. For the torus model, this may be just the camera's pose 112 relative to the model, but for more complex models could also include geometric parameters such as the depth of the haustra.

A difficulty in merging these two sensor streams, shape sensing 106 and camera footage 102, is that the information contained is spatiotemporally offset. The spatial offset 802 is due to the fact that while the image data is a measurement of the area in front of the robot, i.e. proximal to the camera, the shape sensing perceives the area collocated with the robot, i.e. distal to the camera. The temporal offset refers to the potential for the colon's shape to change over time as a result of mechanical interaction with the endoscope. Unlike conventional colonoscopes, MorphGI is, however, designed not to deform the colon as it moves, so the change over time is negligible and, therefore, it is only necessary to consider the spatial offset. For conventional colonoscopes, deformation of the organ is much more significant during cecal intubation rather than during withdrawal when the majority of the screening takes place. For this reason, the temporal offset is also assumed to be negligible for conventional endoscopes. The spatial offset can be considered by estimating the progress of the robot along the colon to identify which camera images and which robot shapes refer to the same locations, synchronising the two sensors. Although shape sensing can apply to any segment of the robot, it is preferable to take measurements from the middle or rear of the three segments of which MorphGI is comprised. This is because during withdrawal only the front segment, containing the camera, is actuated as the robot is typically withdrawn manually by the doctor rather than by using its inchworm-like locomotion method. Hence, the shape of the middle and rear segments are only affected by the colon's curvature, providing cleaner measurements of the colon's shape.

For withdrawal, due to its softness and lack of loop formation, MorphGI has an approximately 1:1 ratio of motion at the tip of the endoscope to motion at the endoscopist's hand. For example, if the endoscopist withdraws 5 cm of endoscope 100 from the patient's anus 704, the camera 402 within the colon 200 will retract roughly 5 cm. For other endoscopes where this is not the case, additional steps may be required to calibrate the insertion depth with the motion at the tip of the endoscope. Therefore, it is possible to estimate the robot's location, measured as the distance from the anus to the camera along the colon's centreline, on withdrawal by measuring the negative insertion depth 702 or the amount of scope withdrawn from the patient's anus. An external position sensor fixed to or close to the patient's anus is used to measure the insertion depth 702 of the endoscope. In addition, based on this data the colon segments 210a-e can be stitched together to display the overall three-dimensional shape of the colon as the scope is withdrawn. This can be used to evaluate the position of the scope 100 and to mark the anatomical locations of medical findings, which normally requires an expensive system of electromagnetic sensors which provide shape information.

There are a number of benefits to using this approach. Firstly, to estimate curvature from an image reliably, the CNN would need to rely on a particularly complex semantic understanding of the image. The CNN would need to estimate the depth of every pixel in the image and in a further step optimize a curved three-dimensional centreline to these points—a challenging task, likely requiring a three-dimensional CNN. The method described above of measuring the curvature of the colon using shape sensing keeps the complexity of the model relatively low and able to operate in real-time. Secondly, it is possible to provide the CNN with curvature information from the shape sensing as an additional input. This essentially gives the decision-making process of the neural network some known information, the approximate three-dimensional shape of the colon in the image, which will improve its accuracy and reliability.

It is preferable to use the described method with a soft robotic endoscope, however, the method can be easily modified to be used with a traditional endoscope. The main hurdle when using traditional endoscopes is that shape sensing data is only possible by using an electromagnetic sensing system. Due to the high stiffness of the endoscope which deforms the colon, this does not represent the local shape of the colon accurately but rather only gives an overview of the colon's shape, e.g. if it contains a loop not the precise shape of said loop. Nevertheless, shape information from a traditional endoscope could still be used to improve the accuracy of the neural network and the model.

Intrinsic Shape Sensing for MorphGI

As described above, curvature parameters required for the model can be obtained using mechanical sensing of MorphGI's shape. The major advantage of the shape estimation method for this purpose is that it uses mechanical sensing and modelling which does not require a complex semantic understanding of the scene, unlike image processing, and so is more reliable.

In addition to its use with the colon model, the MorphGI intrinsic shape sensing may be integrated into an on-screen visualisation of the robot's shape inside of the patient. This visualisation is helpful for the endoscopist to understand the robot's behaviour, for example when progressing around a bend or loop. This is particularly true as self-propelling endoscopes do not provide the endoscopist with the tactile feedback which they are used to in conventional colonoscopy.

The intrinsic shape sensing method could be applied to any soft robot. Crucially, the shape sensing method described does not require any additional sensors to be integrated and requires no non-standard design requirements for the soft robotic segments. This limits the cost and complexity the robot, both of which are critical for a single-use medical tool such as MorphGI and requires no additional space within the robot which is extremely limited for any minimally invasive medical procedure.

Figure 9:
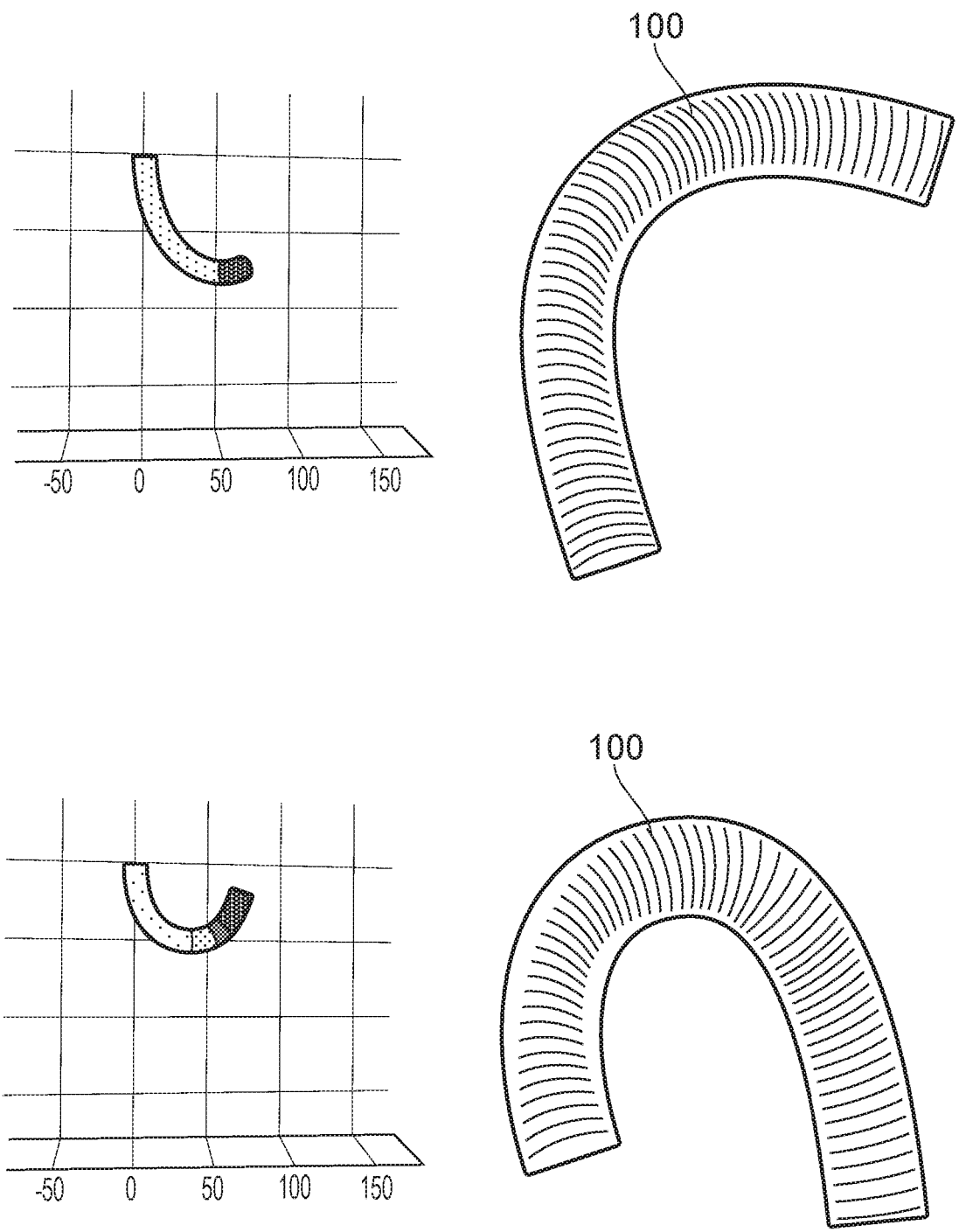
FIG. 9 is an image showing externally bending a segment of the robot to roughly 90 degrees (left) and 180 degrees (right). The real-time visualisation of the segment's measured shape is visible on the user interface behind.

Briefly, the MorphGI colonoscopy robot is constructed from three soft segments, each hydraulically actuated through three internal chambers. The soft segments are able to bend passively through interaction with the environment, conforming to the shape of the colon, in addition to actively through actuation. The concept behind the intrinsic shape sensing is that there is a predictable relationship between the length and pressure of each chamber when decoupled, i.e. considered independently of the other chambers. Firstly, the length and pressure increase due to injecting a known volume of liquid into the chamber are predicted. Secondly, the true pressure of the chamber is measured externally in the actuation unit. The deviation from the prediction is used to calculate the length and pressure change due to external bending. Combining the predicted lengths of the three individual chambers in a kinematic model of the soft segment, the resultant shape of the robot is obtained. The shape information retrieved is the magnitude of curvature, the direction of curvature, and the total extension of the segment. Using a geometric, rather than finite element, approach such as this allows for very large deflections to be modelled, as shown in FIG. 9.

Figure 10:
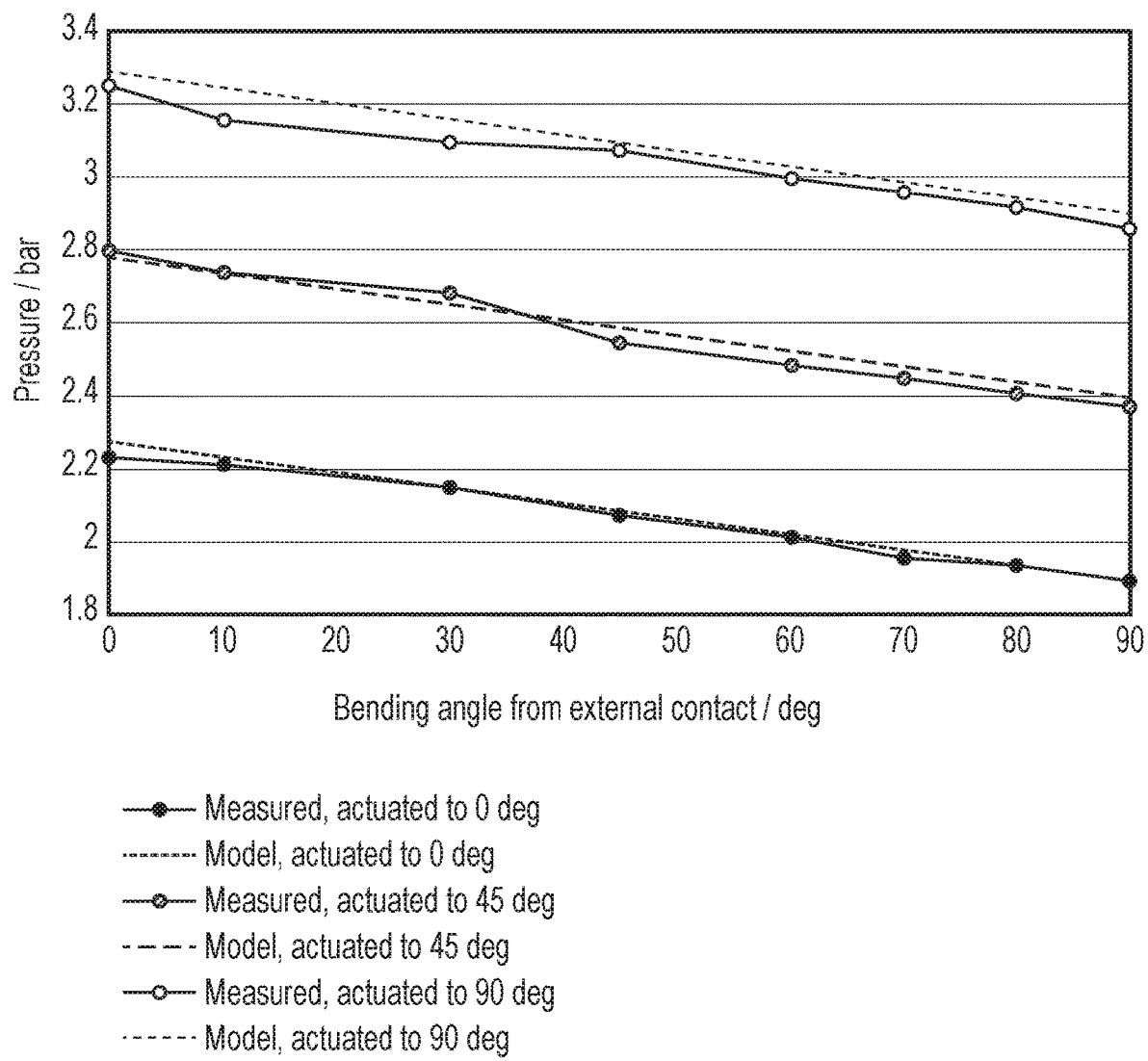
FIG. 10 is a graph showing expected versus normal pressures for a MorphGI soft robotic segment, in both hydraulically actuated and unactuated states.

The accuracy of the model was tested by hydraulically actuating the soft segment to three different bending angles. In each case, the segment was then bent to set angles by external contact and the resulting chamber pressures measured. The model was then used to calculate the expected pressure with respect to each data point. The results are shown in FIG. 10, displaying a strong correlation between measured and modelled pressures.

The Neural Network

A convolutional neural network (CNN) 110 is used to approximate the camera pose 112 and, optionally, additional parameters such as one or more cross-sections of the colon, the number and size of haustra, etc. The CNN may also be used to estimate lumen properties 114 from the image data in embodiments where shape data 106 is not obtained.

CNNs are a machine learning method which require training before being applied. The CNN's training can be self-supervised, meaning that it can train on raw, unlabelled video data. This is important as manually labelling data is time-intensive, prone to human error, and requires an expert, resulting in a costly labelling process and a relatively small amount of training data. A common alternative is to train the CNN in a computer simulation; however, in this case the model will not adapt so well to the difficulties of real colonoscopy footage. Strengths of the neural network method include that it can generalize to any version of the colon model with minimal human adjustment, that it is able to estimate all required parameters simultaneously, and that it runs in a fixed amount of time. The data approximated from the image by the CNN are used then used to interpret the image via the curved model.

Figure 11:
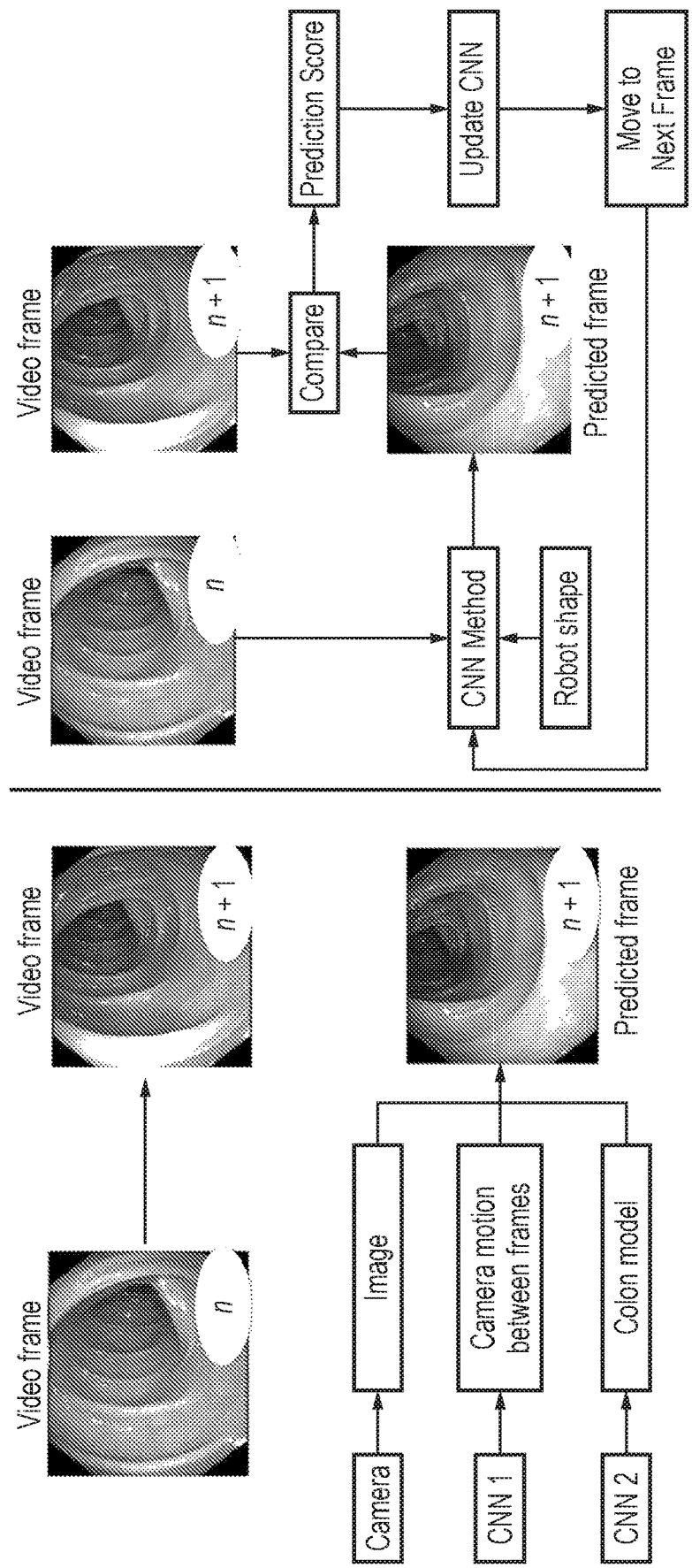
FIG. 11 is a diagram showing (left) how an input frame, camera motion, and fitted colon model are used to predict the next frame of a video and (right) how the predicted frame is compared to the ground truth frame, providing supervision for training the CNNs.

The key concept behind the self-supervised training is that sequential frames in a video are related to one another. It is possible to predict the next frame of a video from the current frame if the geometry of the scene and the motion between the two frames are understood, see FIG. 11 (left). If the predicted frame does not match the true frame closely, this is because the component geometry and/or motion estimates are poor. The next frame therefore acts as the ground truth and this can be used to supervise training of the neural network, see FIG. 11 (right). Initially, the model parameters will be random, and the prediction will be very poor. However, after processing many video frames the CNN 110 will eventually deduce a relationship between the colonoscopy images and the model parameters. The method to produce the predicted frame itself is named novel view synthesis (NVS) and is implemented by applying the curved colon model (described below). The method to judge the predicted frame by comparison to the ground truth, the modified structural similarity index (mSSIM), is also described below. The camera motion between frames and the calibration for the camera intrinsics, which are the physical properties of the camera such as its focal length, may also be deduced by the CNN as by-products. In practice, the camera calibration would most likely be performed pre-operatively and so would not need to be estimated. The camera motion, however, may be used to provide data for the stitching of colon segments 210a-e and to improve the estimation of the camera pose from many measurements over time, e.g. with a Kalman filter.

In some embodiments, the neural network 110 is provided with curvature information (shape data 106) from shape sensing, this will strengthen the performance. To reiterate, this essentially gives the decision-making process of the neural network 110 some known information, the approximate three-dimensional shape of the colon 200, which will improve its accuracy and reliability.

The Three-Dimensional Model

The invention comprises a new model 120 for reconstructing the approximate three-dimensional structure of colon segments seen in optical colonoscopy images with a high computational speed. Throughout this description, the model 120 will be described using the example of the colon 200. However, the skilled person would understand that the concepts described herein could be similarly applied to other lumens with similar morphologies. The model 120 strikes a balance between the previously known overly simplistic cylinder model which cannot be reasonably applied to the colon and overly complex models which are essentially impractical. This tool creates the potential for a range of smart, real-time features for endoscopes 100, such as virtual unfolding described below. The invention could also be applied to semi-autonomous steering of the endoscope within the colon's lumen, something that would be possible with a robotic tool such as MorphGI. In contrast to previous depth map or point cloud-based models of the colon, which only model what is actually viewed, the curved model 120 of the colon described herein predicts the shape of unseen areas. This enables the model to predict areas of mucosa which are not visible and mark these on a map 132.

Figure 12:
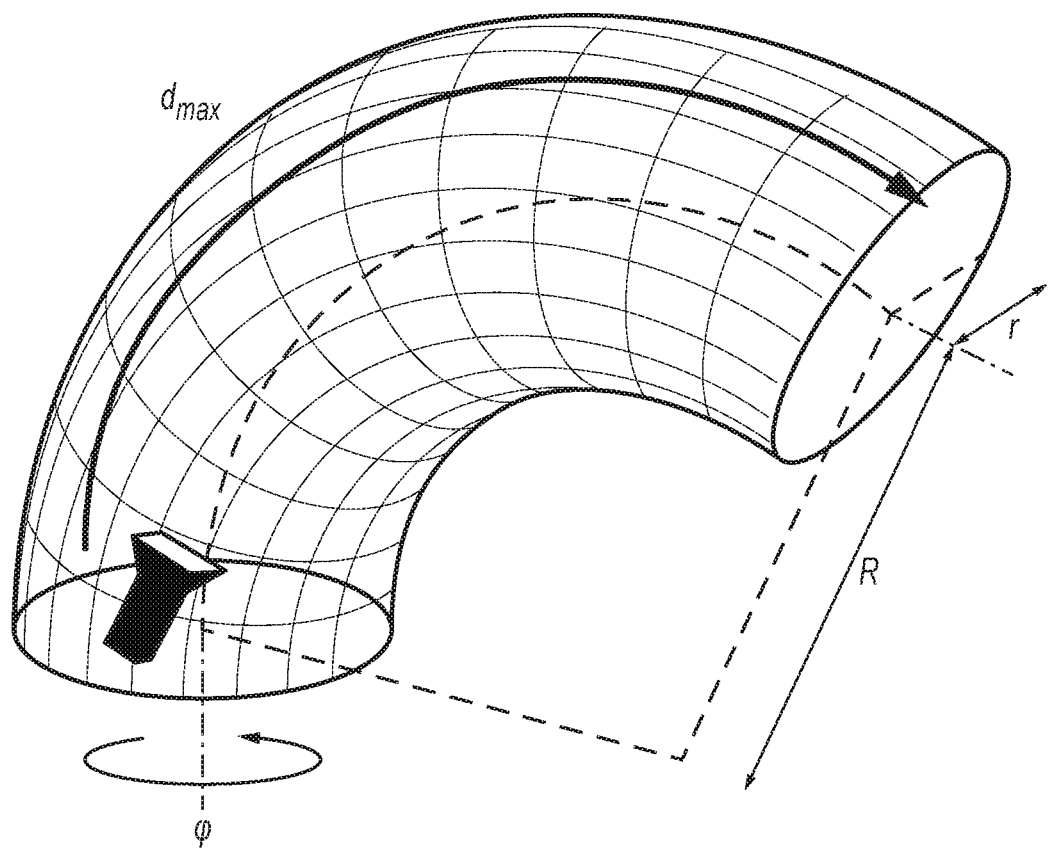
FIG. 12 is a diagram showing the constant curvature torus model where r is the radius of the segment, $d_{max}$ is the length of the segment, R is the magnitude of constant curvature and φ is the direction of constant curvature.

The colon model 120 employs two central concepts. First, it is assumed that in local regions the curvature of the organ 200 is smooth. In a preferred embodiment, constant curvature is assumed. Second, the cross-section of the colon 200 is modelled so that its geometry can be expressed mathematically, either discretely or continuously. For example, assuming that the colon is circular in cross-section, as shown in FIG. 12, and in this case the model is equivalent to a torus segment (referred to as the torus model). If the segment's curvature was also zero, the model would be equivalent to a cylinder segment. Together, these two concepts remove the need to estimate the three-dimensional positions of many points in the colon separately, reducing the complexity from potentially millions of parameters to, in this example, less than 10. For the torus model the geometric parameters are the magnitude and direction of constant curvature, and the length and radius of the segment. In addition, the 6 degrees-of-freedom pose of the camera relative to the lumen is also needed to interpret the image produced by said camera.

Figure 13:
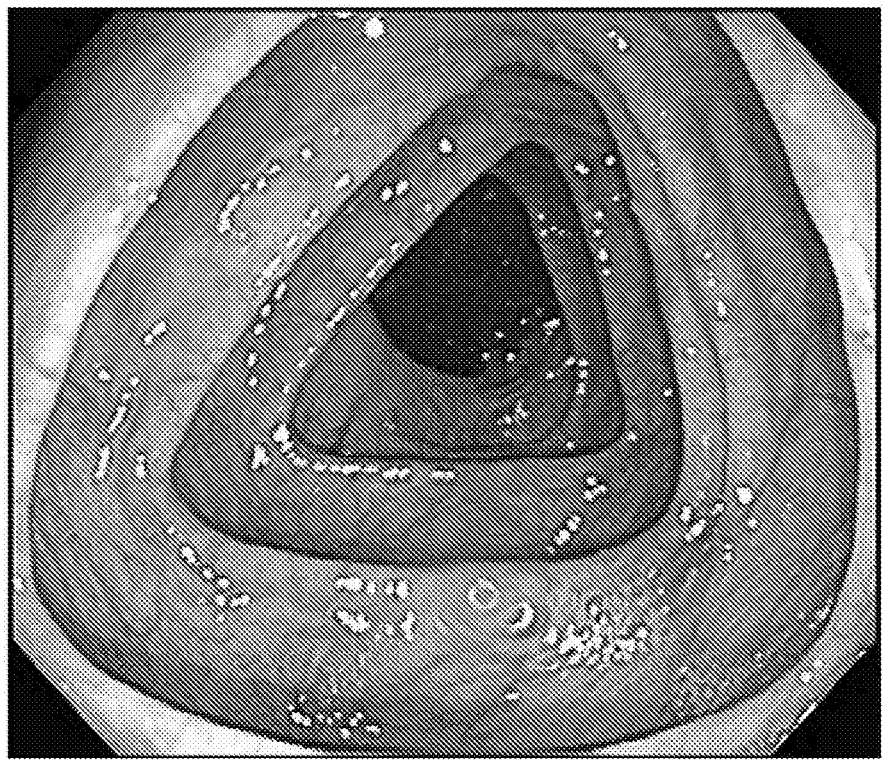
FIG. 13 (left) is an image of the transverse section of the colon with a typical rounded triangle shape.
Figure 13:
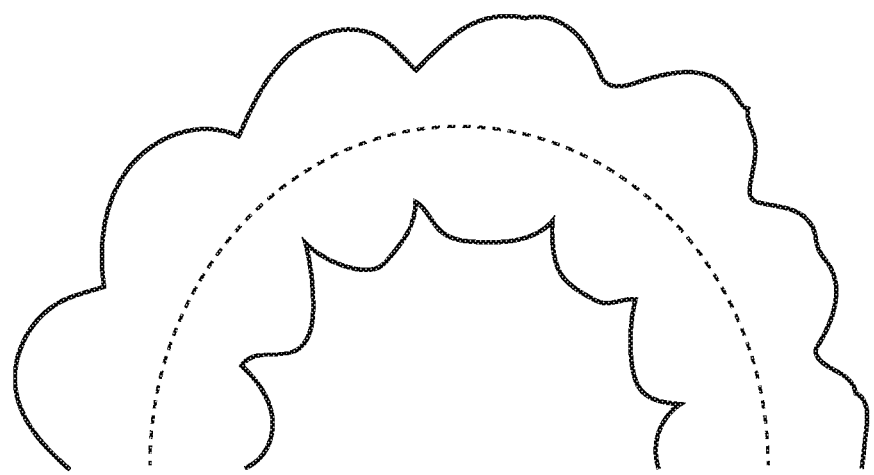

Non-circular or variable cross-sections are also possible and could better approximate the real colon geometry. A non-circular cross-section, for example, would have particular benefits for the transverse section of colon which typically has a rounded triangular shape as shown in FIG. 13 (left). This and any other cross-sectional shape can be accommodated by employing existing numerical methods from computer graphics to generate and perform calculations with the geometry. These methods also provide the additional benefit of increasing the speed of computation. Similarly, cross-sections which vary along the colon segment are also possible. For example, by varying the radius of the torus model's diameter in FIG. 13 (right), the haustral folds of the colon can also be modelled.

The model has been tested using a Novel View Synthesis (NVS) method (mentioned above in relation to the neural network) within a medical colonoscopy phantom. A single colonoscopy image is taken and then the camera is virtually moved through three-dimensional space, synthesising new, unseen views from the three-dimensional understanding of the image. This is then compared to the ground truth view for each new camera position. A synthesised output that is closer to the ground truth indicates that the three-dimensional understanding is more accurate. Note that: for testing purposes, the model parameters are known a priori and hence only the applicability of the model itself is tested; a circular cross-section (torus model) is assumed and the cylinder model is used as the baseline for comparison.

Figure 14:
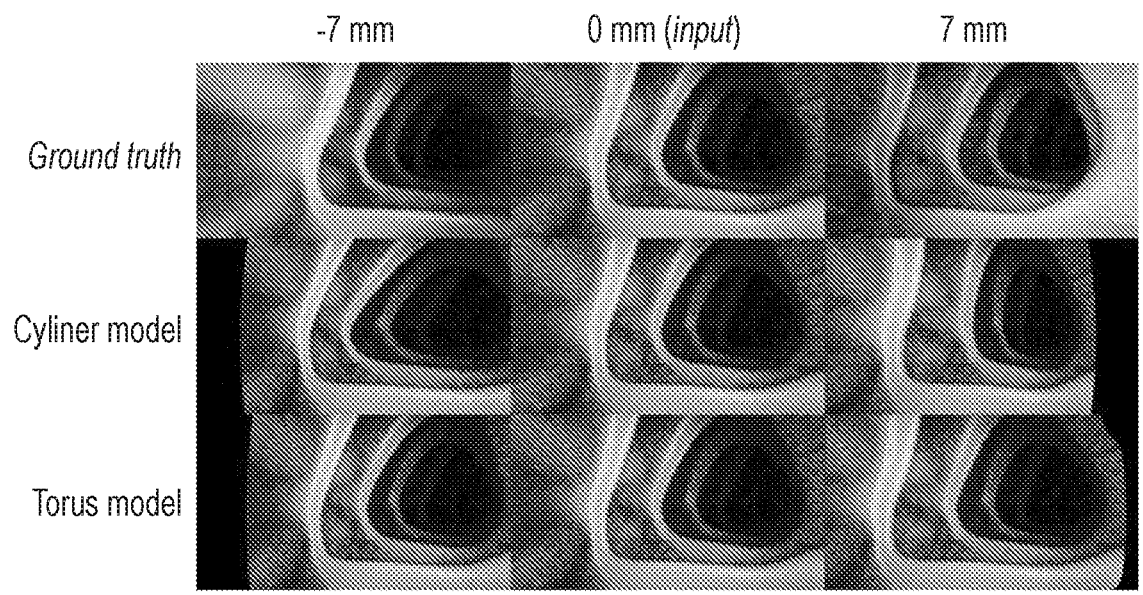
FIG. 14 is a qualitative (left) and quantitative (right) comparison of novel view synthesis to ground truth for translations perpendicular to the camera view. Similarity is measured with mSSIM and a positive mSSIM change indicates superiority of the torus model over the cylinder model. Curvature k is the reciprocal of R (shown in FIG. 12) and is measured in $mm^{-1}$.
Figure 14:
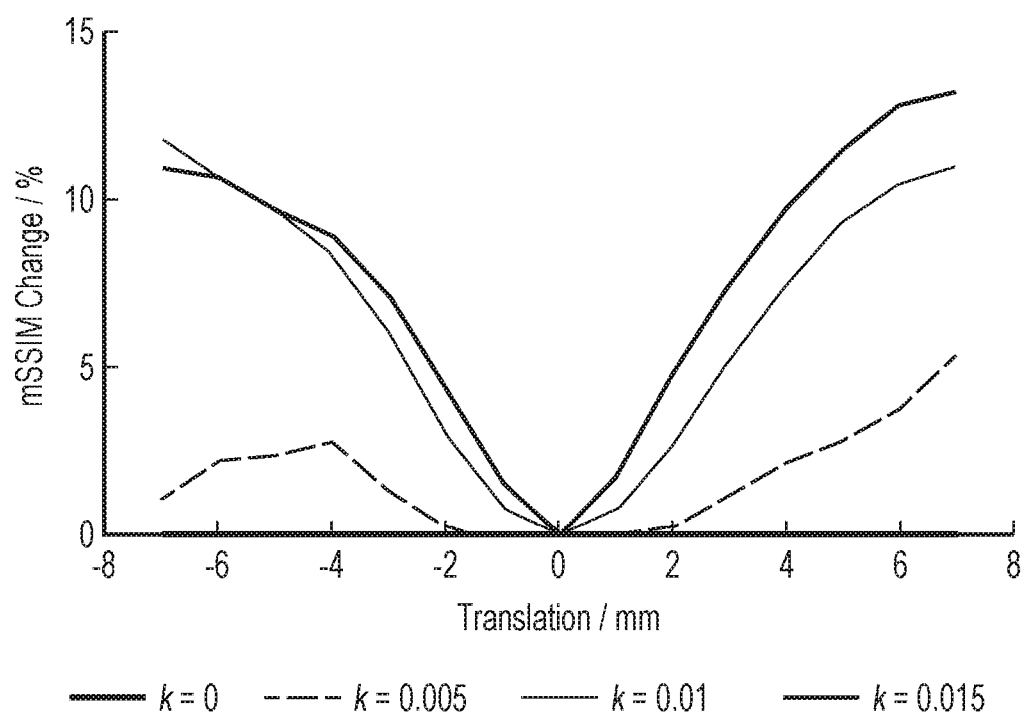

An example of ground truth versus synthesized views for translations perpendicular to the camera view is given in FIG. 14 (left). Note how the cylinder model distorts the haustra whilst the torus model retains the original structure of the lumen. A custom image similarity index (mSSIM) is used to quantitatively compare the synthesised view against the ground truth. mSSIM values range from 0%, 'two random colonoscopy frames', to 100%, 'two identical colonoscopy frames'. In FIG. 14 (right), the difference in mSSIM between the cylinder and torus models is shown, where a positive mSSIM change indicates superiority of the torus model compared to the cylinder model. Repeating the experiment with different colon curvatures, $k=1/R$, confirms the assumption that as curvature increases the torus model becomes increasingly beneficial as compared to the cylinder model. For every data point the torus model either matched or outperformed the cylinder model although, clearly, when k is 0 the two models are exactly equivalent. In almost every case, relative performance also improved as the novel view moved further from the input view and the task became increasingly challenging. These results show that the torus model produces a more accurate and therefore useful three-dimensional reconstruction of a colon segment, providing higher quality results over a greater range of colon curvatures than the cylinder model.

A key aspect of the invention is using a curved model to model optical footage of the gastrointestinal (GI) tract, in particular, applying a constant curvature assumption to the colon. Prior work has either used the extremely simple cylinder model, typically for the small intestine, or extremely complex depth estimates for the colon. Furthermore, non-circular and variable cross-sections have not been applied to GI tract models with either a straight or curved centreline before. This is largely because the cylinder model is commonly used for the small intestine which better meets the constant, circular cross-section assumption.

Figure 15:
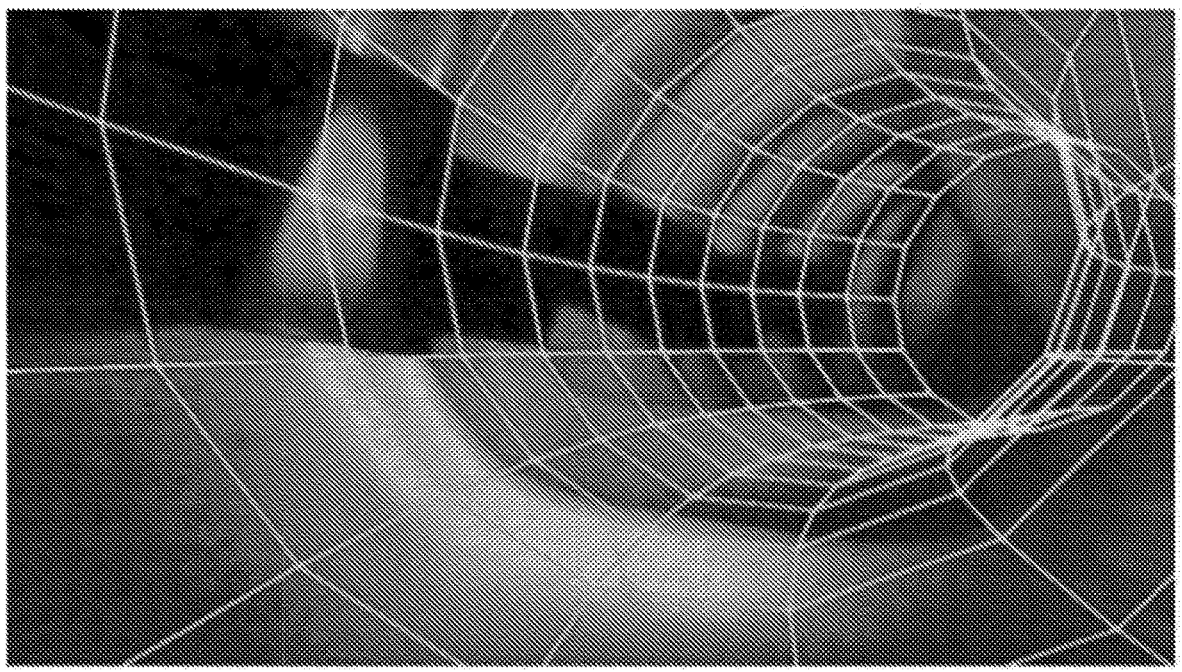
FIG. 15 is an image taken from a medical colonoscopy phantom with the torus model projected onto it.

To apply the model, model parameters such as colon curvature and camera position that fit the given image must be selected, as shown in FIG. 15. FIG. 15 shows the torus model projected onto an image taken from a medical colonoscopy phantom. For the cylinder model, the geometry is typically assumed to be constant, and the radius and length are pre-set. For the camera pose, the typical assumption is that the colon is straight, and that the darkest pixel represents the centre of this straight tube. However, these assumptions are extremely fragile and can only estimate the camera's rotation but not position. For simpler environments such as in the small intestine, the movement is constrained, and this assumption is acceptable. The colon, however, is far from straight and the camera is free to move in any direction. Approximating the parameters of the model is challenging but also crucial for real-world usage. In a preferred embodiment the core, unique principles of MorphGI are used in order to achieve this estimation in real-time. The model is fitted during withdrawal rather than caecal intubation, as this is typically the diagnostic portion of the procedure.

The Unfolding Program

Clinicians have a pressing need for technology which can produce a digitized map 132 of the colon on which areas of unseen tissue are indicated. Such a map could guide clinicians to blind spots in real-time, significantly improving the detection of cancers. In addition, such a map could modernize documentation of the procedure, providing benefits for postprocedural quality control and training.

Unfolded maps of the colon, that is, representing its three-dimensional structure in a two-dimensional form, have been investigated by numerous researchers using the three-dimensional medical imaging data available from Virtual Colonoscopy (VC). However, Optical Colonoscopy (OC) remains the gold standard for colon screening and is, as such, substantially more common. However, no equivalent methods exist to unfold the two-dimensional video data provided by OC.

Figure 16:
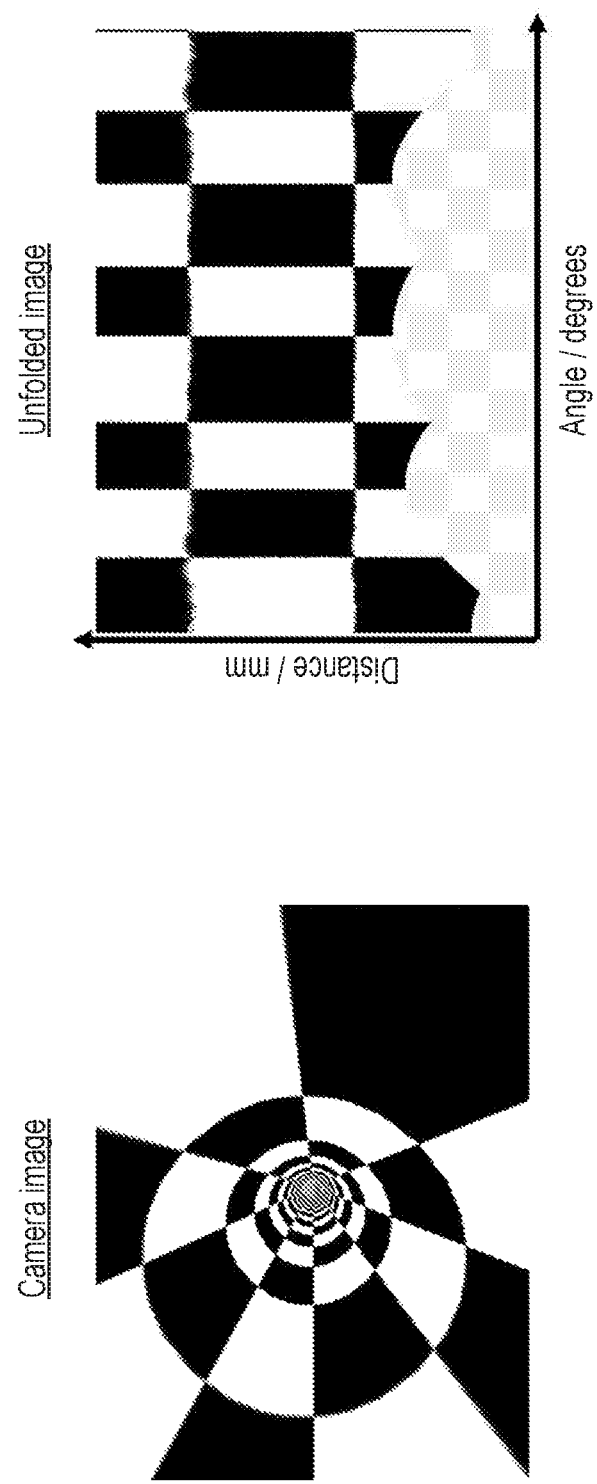
FIG. 16 is an illustration of the virtual unfolding process with, for this example, a camera image of a checkerboard-textured cylinder. In the unfolded image, the y-axis is the distance along the cylinder, the x-axis is the angle around its cross-section, and the grey-white grid represents unseen areas such as those perpendicular to the camera.

The virtual unfolding program 130 takes the three-dimensional model 120 as an input to unfold the image data 102 forming a two-dimensional image 132 of the lumen 200. The two-dimensional map 132 represents the internal surface of the colon's tissue as a panoramic image, as illustrated in FIG. 16 on a basic cylindrical geometry. The curved lumen model described previously enables the reconstruction and unfolding of each frame of a colonoscopy video stream with high efficiency and, equivalently, at high speed.

The virtual unfolding method was tested on images taken by the MorphGI robotic colonoscope as it moved through a medical colonoscopy phantom. The phantom was laid out to create a range of bends. A straight black marker was adhered along the colon wall in order to provide a qualitative reference of colon direction in the unfolded maps.

Figure 17:
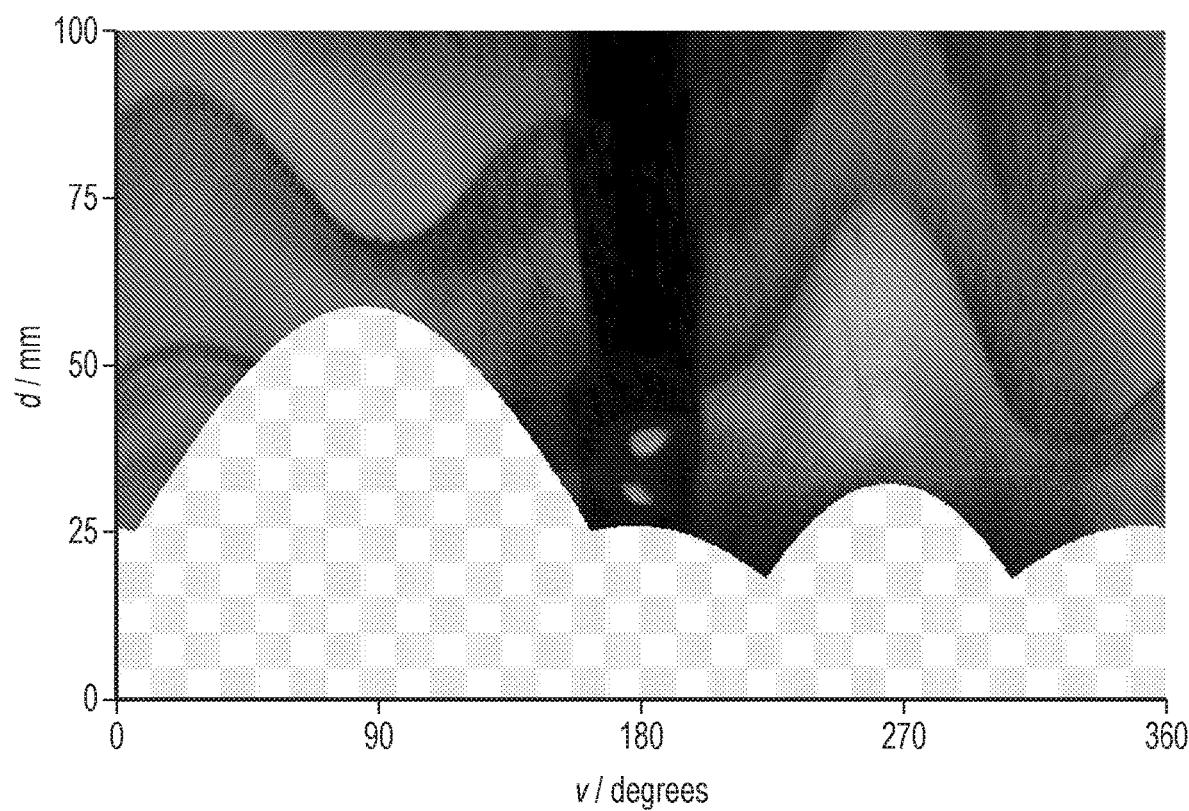
FIG. 17 shows the result of virtually unfolding a straight segment of colon (curvature, k=0 mm−1). d is the distance along the colon and v is the angle around its cross-section.

FIG. 17 shows the result of virtually unfolding a straight segment of colon. Without curvature, as in this case, the cylinder and torus models are geometrically equivalent. To note a few key features of the unfolded image:

The haustral folds are circumferential contractions and as such can be seen stretching horizontally across the unfolded image. In this experimental setup the phantom's lumen had a triangular shape which is also a common feature of the transverse colon. This does not match the circular cross-section of the torus model, causing the folds to appear wavy in the unfolded image. Another embodiment of the curved model with, for example, a triangular cross-section would improve this if required.

The white-grey grid in the unfolded image signifies the unseen areas of tissue. An area of tissue can be unseen either because it is outside of the area which the camera is viewing or because it is hidden behind another area of tissue—the unfolding program can handle both of these possibilities. Note that even in a straight segment of colon, the tissue in areas perpendicular to the camera is not visible.

The quality of the unfolded image degrades further from the camera. One cause of this is that, due to perspective, the camera's image contains less information about more distant areas. Naturally, this is reflected in the unfolded image as decreased resolution as distance increases. The second cause is that any imperfection in the model is likely be exaggerated further from the camera, with the three-dimensional position estimates becoming less accurate. This will result in increased distortion or other visual errors in the unfolded image as distance increases.

Figure 18:
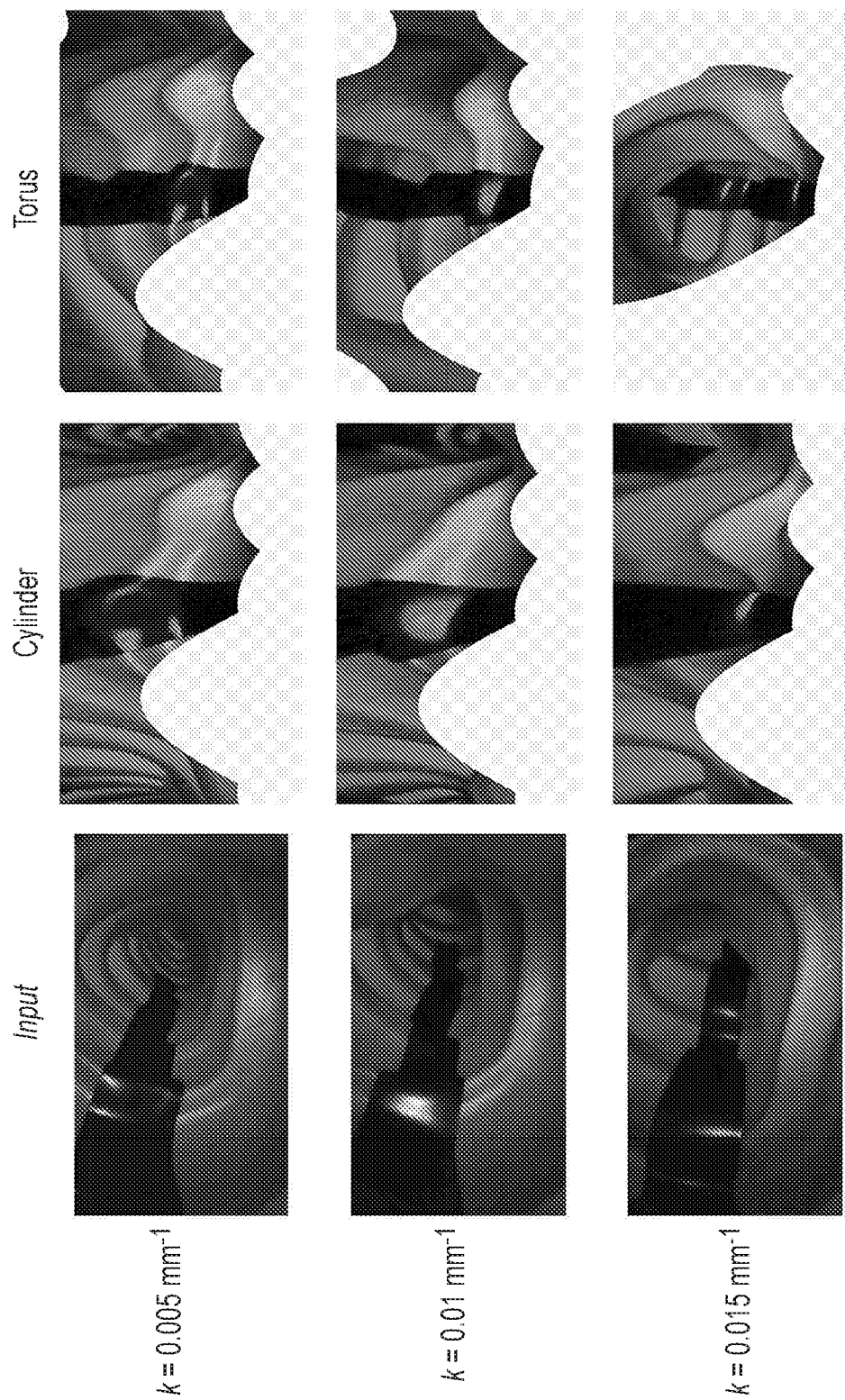
FIG. 18 shows a comparison of using the cylinder and torus models for virtually unfolding a segment of colon. Three segments of increasing curvature, k, from top to bottom are shown. In the unfolded images, the y-axis is the distance d along the colon up to 100 mm, the x-axis is the angle v around its cross-section, and the white-grey grid signifies unseen areas of tissue.
Figure 19:
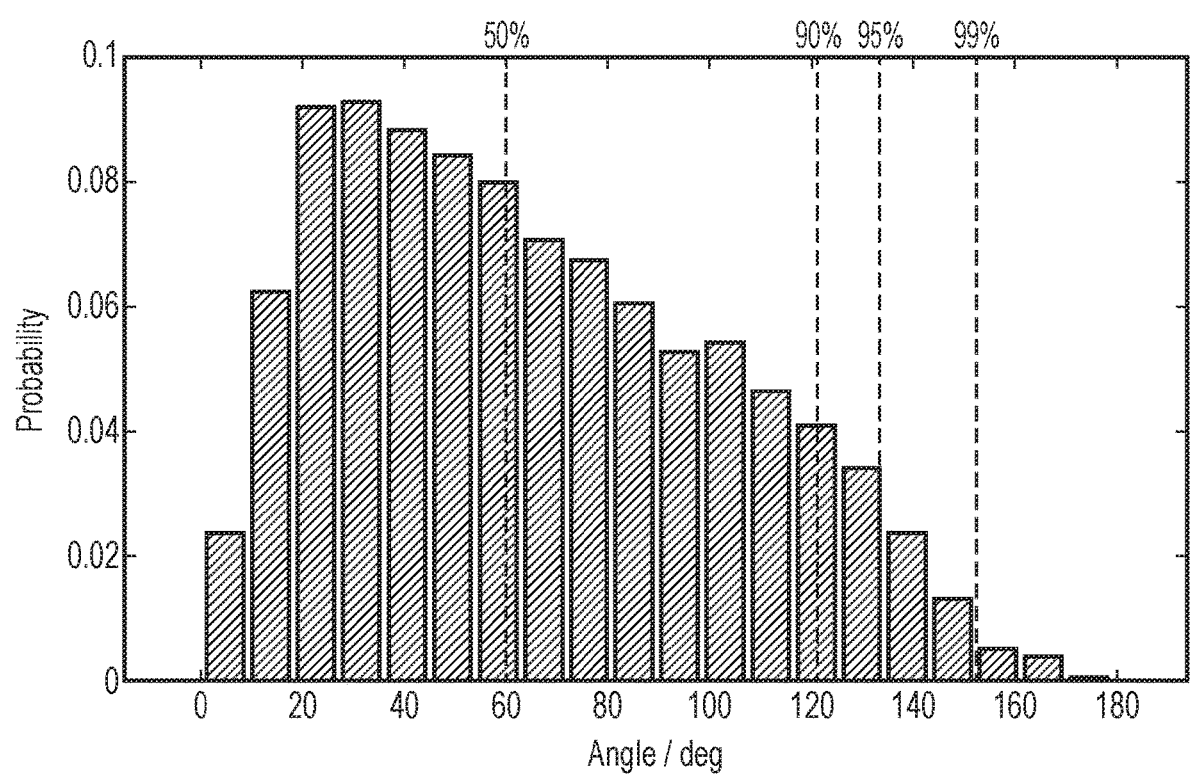
FIG. 19 shows a histogram of the angles between the two ends of a 5 cm segment of colon. The vertical lines show the 50th, 90th, 95th, and 99th percentiles respectively. Segments were extracted from virtual colonoscopies of 12 different patients at 2 mm steps along the colon.

A qualitative comparison of the unfolded maps produced by the cylinder and torus models is presented in FIG. 18. These unfolded images are equivalent to the example shown in FIG. 16, except in this case with a colonoscopy photo as the input image. It is known that the black marker has a constant width and runs along the colon and the haustral folds manifest approximately perpendicular to this. As such, in the ideal case, the haustral folds will appear horizontal in the unfolded image, while the marker will appear vertical and with constant width.

In the images unfolded with the torus model, the marker is vertical and of constant width, without major distortion. However, at higher curvatures, some haustral folds no longer appear horizontal. This is due to the extremely non-circular cross-sections in these test photos which, as before, can be remedied by varying the cross-section of the curved model in a different embodiment of the invention. In contrast, the images unfolded with cylinder model fail to produce a meaningful output in all cases, even in the colon segment with the lowest curvature tested. In particular, these unfolded images do not maintain the width of the black marker or, crucially, the horizontal appearance of the haustral folds. Furthermore, note that the torus model predicts additional areas of tissue which cannot be seen, while the cylinder model misses these—a critical weakness for detecting blindspots.

There are two main ways in which tissue is left unseen, and therefore uninspected, in colonoscopy: either it was hidden behind a haustral fold, or the camera was simply never pointed in that direction. There is disagreement in the literature as to the relative impact of each of these deficiencies on missed polyps. It should also be noted that clinically, polyps may also be missed due to other errors such as inadequate cleaning, with liquid or stool obscuring the view, or being seen by the camera but not recognised as a polyp by the clinician. These errors are, however, less fundamental, as if the tissue area was never seen by the camera, then the miss rate is guaranteed to be 100%.

Figure 20:
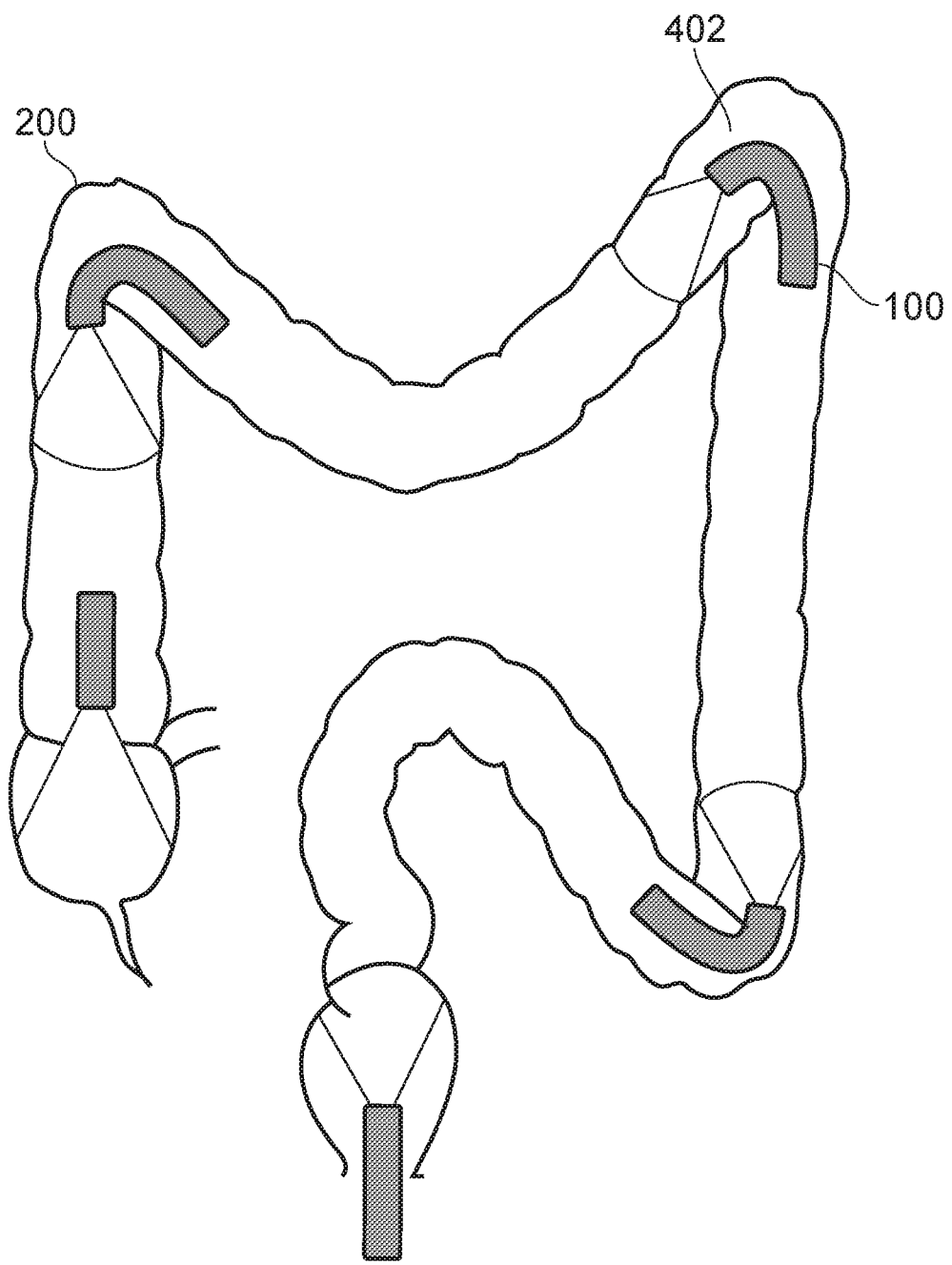
FIG. 20, courtesy of "*Cotton and Williams' Practical Gastrointestinal Endoscopy: The Fundamentals*", shows how many of the most common blind spots are located at acute bends in the colon.

The torus model does not attempt to model the haustra and hence areas hidden behind the haustral folds cannot be predicted. However, many of the most common blind spots are located at acute bends in the colon, as shown in FIG. 20, courtesy of "*Cotton and Williams' Practical Gastrointestinal Endoscopy: The Fundamentals*". One particular reason for this is that while the outside of a flexure is readily visible, the colonoscope must be reinserted and hooked to selectively view the opposite side. These blind spots can be predicted by the torus model and hence can be used to avoid these common errors in clinical practice.

Figure 21:
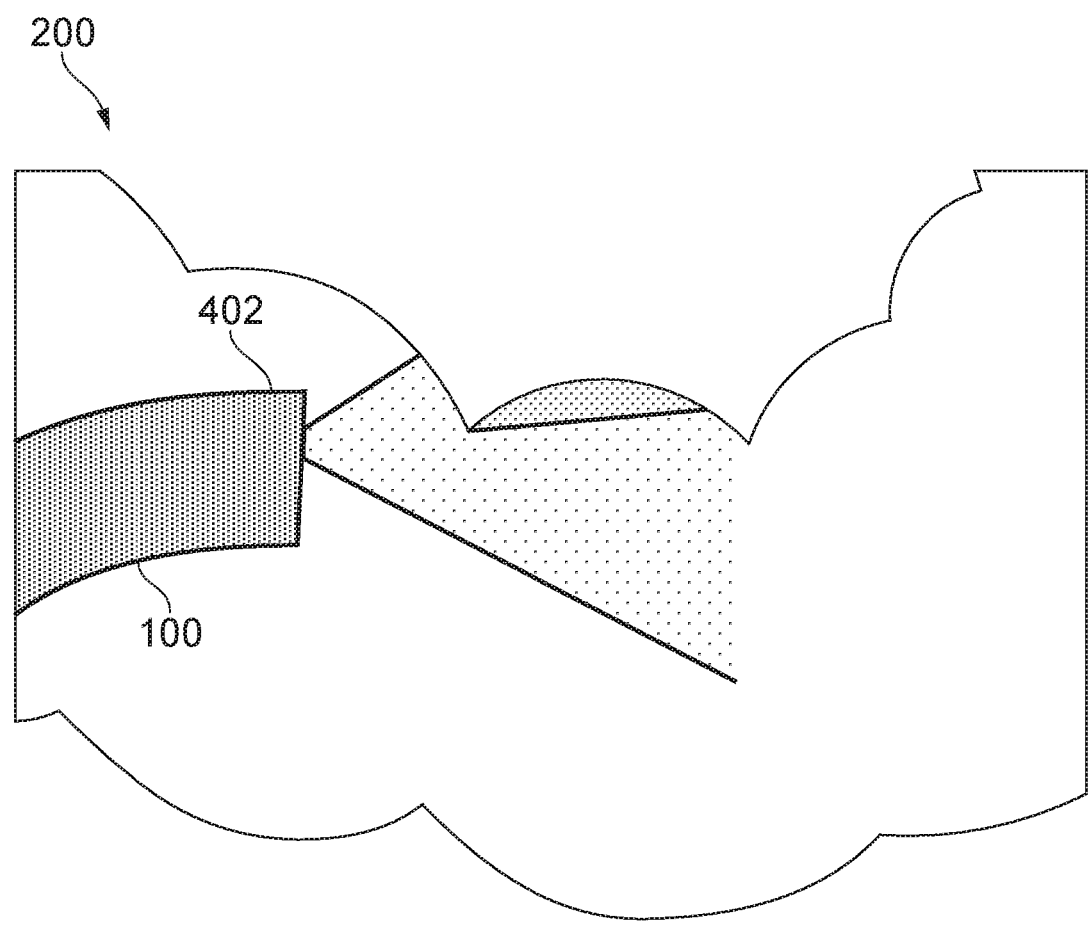
FIG. 21 shows how areas of tissue can be hidden behind haustral folds.

In an alternative embodiment of the curved model, as seen in FIG. 13, however, haustra are indeed modelled by varying its cross-section. In this case, areas of tissue hidden behind haustral folds, such as the area indicated in FIG. 21, can also be predicted and therefore indicated to the clinician on the virtually unfolded map.

SUMMARY AND ADVANTAGES

To summarise, the key aspects of the invention described herein are as follows:
Using a curved model, in the preferred embodiment a constant curvature model, for optical footage of the gastrointestinal tract.
Using non-circular or variable cross-sections in a colon segment model with a straight or curved centreline.
Combining robotic sensing, in the preferred embodiment endoscope shape and insertion depth data, and camera sensing to fit a colon segment model.
Using chamber pressure and volume to concurrently actuate and sense the shape of a soft robot.
Using pressure-based shape sensing for visualisation of an endoscope's shape and the overall path travelled through the colon.
Using a neural network to predict camera pose from the camera image, enabling the prediction of blind spots even when the centre of the lumen is not visible.

Blind Spot Prediction

Almost all existing methods fall into the category of photogrammetry, that is, the reliable measurement of physical objects from images. As such, these methods use various techniques to create point clouds of what is seen; however, no prediction is made about what is not seen. To model what has not been seen by the doctor, the present invention incorporates prior knowledge on the typical geometry of the colon and additional sensor information beyond the camera image. Specifically, the invention assumes that any local area of the colon approximates a tube with a particular curvature and cross-section, where the curvature of the colon is measured from the endoscope's shape. This allows the invention to produce a map of the colon marked with areas which have been missed during screening, indicating to the clinician that they should attend to these locations. This use case will improve the diagnostic effectiveness of the procedure in a direct and immediate sense; however, the invention's blind spot prediction can also be used post-operatively as a performance indicator and training tool.

Virtual Unfolding

Beyond the lack of blind spot prediction, this class of methods also represents the colon as a general three-dimensional model with no predefined structure. Viewing these models at a glance, however, has many of the same problems as viewing the colon image itself—that is, the full model is not visible without moving the camera. The invention's representation, by contrast, is built around a central axis running along the colon which allows for virtual unfolding to a two-dimensional image. During the procedure, this two-dimensional image can then be shown on a screen to be read by the clinician alongside the endoscopic feed. This use-case is only possible if the method works in real-time—a challenge which very few methods can meet. The described invention achieves this by using both a model with low dimensionality and additional shape sensing information from the endoscope.

Comparison to Closest Prior Work

The cylinder model of the colon is the closest comparison to the invention. It is, however, overly simplistic and not well-suited to the bends and varying shape of the colon, failing in all but a few carefully picked video segments. Experiments described herein have shown superiority of the curved model of the colon over the cylinder model. The non-curvature assumption of the cylinder model breaks down quickly as the distance from the camera increases. It is not suitable because it does not effectively match the true morphology of colon. By contrast the curved model described herein can reconstruct considerably longer segments, processing data at a greater distance from the camera. This is crucial for blindspot detection as the perception of the lumen model must match that of the clinician. In other words, if the model can only function close to the camera but the doctor can perform diagnosis beyond that distance, the area beyond the model will be incorrectly registered as a blindspot. There is also a technical advantage to this in that a longer model increases the overlapping region when stitching together individual frames, leading to higher accuracy and improving interpretation of fast camera movements which are a common occurrence in colonoscopy.

Further Embodiment

In this further embodiment we propose a system for detecting, in real-time, broad areas of tissue which have not been inspected during a colonoscopy, as in the earlier embodiments. This is achieved in 4 key steps. First, a 3D point cloud is acquired for the frame. Second, from the point cloud input we model the geometry of the colon around the camera. This model extends beyond the visible region, providing a 3D interpretation of what the camera sees as well as a prediction of what it doesn't. Third, we identify blindspots according to the camera parameters and 3D model. Lastly, we combine the frame-by-frame blindspot estimates to produce a cumulative map indicating which tissue has and hasn't been seen so far during the procedure.

Here, we assume that a point cloud and motion estimate is provided as input. In the case of robotic colonoscopes, this data could be produced by sensors such as the miniature time-of-flight cameras integrated into modern smartphones. For traditional colonoscopes, traditional 3D reconstruction methods such as SfM or modern monocular depth estimation methods built on deep neural networks could be used. Frame-to-frame relative camera motion can then be estimated by registering two sequential point clouds. Note that in contrast to other methods, the point cloud only acts as an initial reconstruction, and so, only needs to be sparse. This sparsity avoids many of the typical challenges involved in other methods, such as sensor resolution or reconstruction density, reliability, and speed.

The Torus Model

Figure 22:
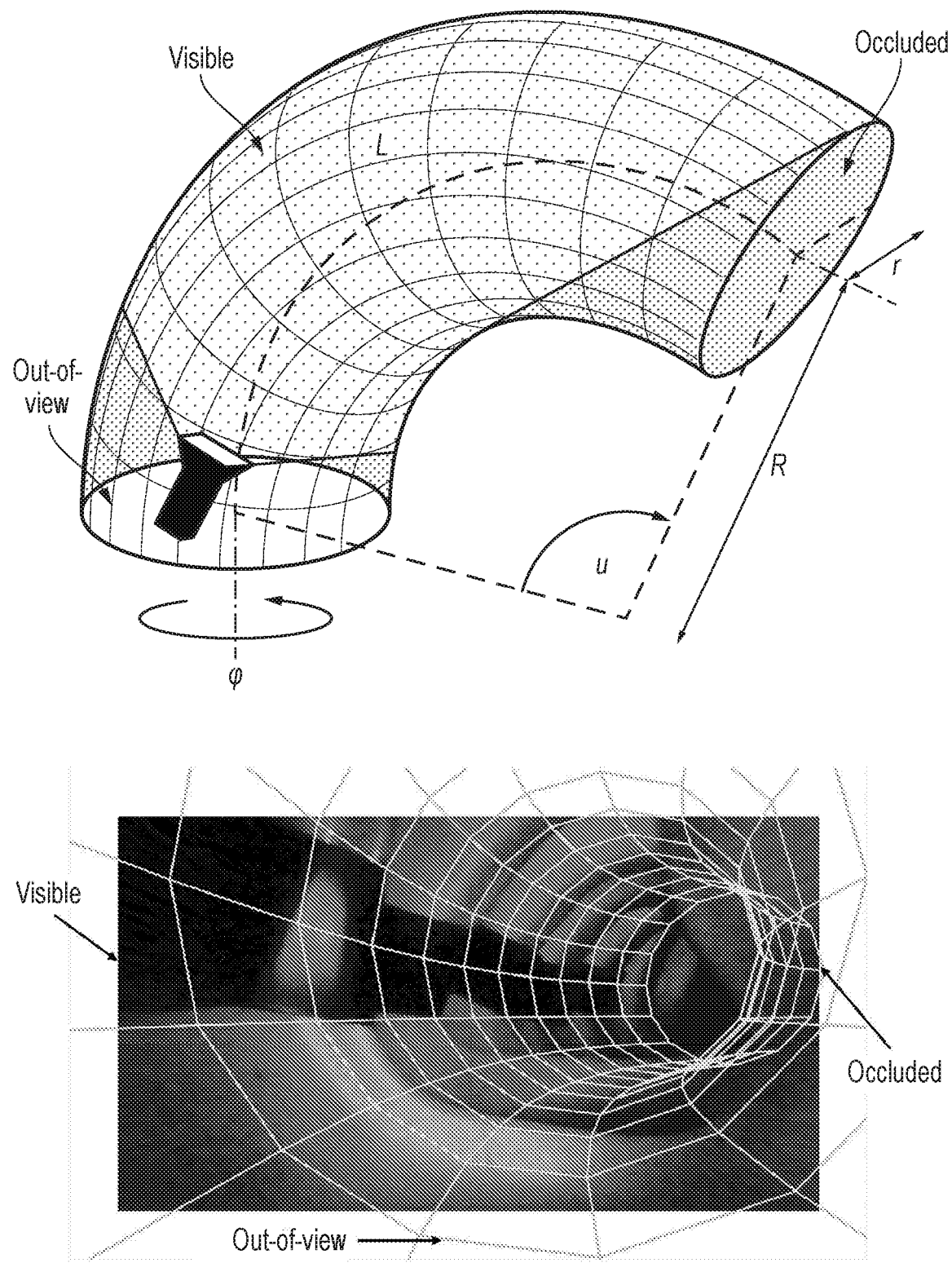
FIG. 22 shows a torus model on a projection according to one or more illustrative aspects described herein.

We propose that a highly detailed 3D reconstruction is not needed to predict whether broad areas of tissue have been inspected. Such methods increase complexity which may negatively impact reliability and processing speed. Instead, the torus model proposed here (FIG. 22) approximates the local structure of the colon as a 'curved tube' and is able to detect a number of different types of blindspot. However, note that, crucially, we assume that the colon wall is smooth and therefore do not attempt to model the haustral folds or detect those blindspots behind them. In comparison to a cylinder model, the torus model includes curvature to better approximate the 3D shape of the colon. However, crucially, as the cylinder model cannot predict the occlusion at acute bends. This is arguably the most common and clinically relevant type of blindspot and so this is a substantial drawback.

TABLE I

Notation

| Symbol | Meaning |
| --- | --- |
| R | Major radius of the torus |
| r | Minor radius of the torus |
| L | Length of the model |
| p | Cartesian point on the torus' surface |
| n̂ | Unit vector normal to the torus' surface |
| u | Angle along R in radians |
| v | Angle around r in radians |
| k | Curvature of the torus |
| r | Ray (vector) from the camera to p |
| t | Line parameter of r |
| Q | The intersection points of r and the model |
| q | Element of Q closest to and ahead of the camera |

The cylinder and torus models share assumptions 1 and 2 (below) regarding the colon's cross-section. However, whereas the cylinder model assumes that the segment is perfectly straight, the torus model assumes that it curves smoothly (assumption 3). The torus model therefore only contains one additional parameter. Throughout the paper, we will use the notation given in Table I.

Assumption 1: The cross-section is circular.
Assumption 2: The cross-section is the same throughout, e.g. it contains no haustra.
Assumption 3: The centreline bends with a constant curvature, i.e. k≥0.

The inputs to the torus model are length, radius, and curvature, which together approximate the colon's 3D shape. In order to interpret a colonoscopy image, the camera's pose relative to the model/colon is also required.

Model Fitting

Given a sparse point cloud of 3D locations relative to the camera, we fit the torus model. In doing so we approximate the geometry of this local area of colon, and the relative pose of the camera and model. Together, these provide an interpretation of what the camera is seeing, as well as what it isn't. For an effective fitting method, the selection of appropriate parameters, constraints, an initial guess, cost function, and optimization algorithm are all critical. We will summarize these here.

Our optimization parameters are the position (in Cartesian coordinates), orientation (in Euler angles), and curvature of the colon's centreline. These together define the colon's centreline (equivalent to the torus' major circle) in addition to the colon's radius (equivalent to the torus' minor circle). The model is positioned with respect to the centreline rather the torus' centre as this most closely represents the parameters' physical meanings. This therefore creates a continuous parameter space which is preferable for optimization. We use non-linear interior-point optimization from the MATLAB Optimization Toolbox with a least-squares cost function, that is, the sum of the point errors squared. Point errors are defined as the distance between each point and its projection onto the model, i.e. its closest point on the torus' surface.

We bound the minor radius between 5 mm and 50 mm. These values were selected by extracting and measuring the cross-sections of 12 CT scans and selecting the range after filtering outliers. The major radius is bounded to a maximum of 500 mm. At this length, given the aspect ratio of the torus, the small visible segment of the model is effectively straight. This bound is therefore necessary to prevent the optimization from attempting to approach infinity, causing slow convergence times. We set the linear constraint |z|≤r to keep the centreline point close to the camera. Finally, the distance from the camera (at the origin) to the surface is calculated so as to be signed, with a negative error indicating that it is within the surface of the model. By setting a non-linear constraint to keep this value below 0, we can ensure that the camera is kept within the model.

Our initial guess predicts that the camera is coincident with the centerline, a reasonable approximation given our knowledge of colonoscopy, and that the major and minor radii are the average of their respective bounds. The optimized parameters of the previous frame are then used as the initial parameters of the next frame encouraging temporal consistency, i.e. that the model varies smoothly over time. An exception to this is when the fitting has failed, as discussed below. In this case, the previously optimized parameters are considered erroneous and we default back to our initial guess, escaping the local minimum.

Figure 23:
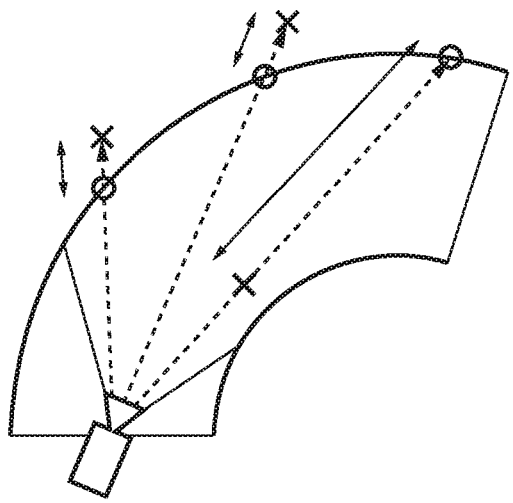
FIG. 23 shows a projection point cloud according to one or more illustrative aspects described herein.

Given the nature of the input data and model, the fitting for some frames will fail, that is, the optimized model will not create an acceptable interpretation of the camera image. In order to detect this, we propose an algorithm for validating the model's fit. Note that it is possible that a torus fits the point cloud closely from a global perspective but not from the camera's perspective—particularly when there are few points in the point cloud, as shown in FIG. 23. This principle is used for error detection. Our metric is camera-centric as, ultimately, we are interpreting the image from the camera's point-of-view. To calculate the metric, the point cloud is first projected onto the model from the camera's perspective via ray casting. We then calculate the 'reprojection errors' as the distance between the point cloud and projected locations. Any points with a reprojection error above a tolerance (4 mm, obtained empirically) is classified as erroneous. If the majority of points are erroneous then the fitting is deemed to have failed. Although this metric is effective at detecting models which produce a poor interpretation of the camera image, it cannot, however, be used for optimization due to discontinuities in the parameter space.

In FIG. 23, given a torus model, each point in the point cloud has a reprojection error. The bottom-most point in this example fits the model closely from a global perspective, but not from the camera's perspective. This principle is used for error detection The output of the optimization process is a complete torus, or 'doughnut', only a segment of which will be used to model the colon. The segment cannot be optimized with the least squares method as a change in length at each iteration would, by definition, change which points are included/excluded from the optimization process, causing instability. Instead, any non-erroneous points, i.e. with a reprojection error less than our previous tolerance are projected into the (u,v) model space, see FIG. 22. The minimum and maximum of u then give the torus segment covered by the available point cloud data. However, to improve robustness, we first remove outliers from the set of u. We define outliers as angles more than 1.5 interquartile ranges above the upper quartile or below the lower quartile. This is a standard definition which, importantly, does not assume that the data is normally distributed.

Blindspot Detection

We now describe the algorithms which perform blindspot detection. The inputs are the fitted model and an estimate of the camera's pose.

Points $p \in \mathbb{R}^3$ and normals $\hat{n} \in \mathbb{R}^3$ across the model's surface are defined according to the parametric equations (1) and (2) below. We generate points with linearly spaced angles (u, v), see FIG. 2, in the intervals $u \in [0, L/R]$ and $v \in [0, 2\pi)$. We cast rays $r(t) := (r_x(t), r_y(t), r_z(t)) \in \mathbb{R}^3$ from the camera's optical center to each point p.

$$p(u,v) := \begin{pmatrix} p_x \\ p_y \\ p_z \end{pmatrix} = \begin{pmatrix} (R\cos u - R) + r\cos u \cos v \\ r\sin v \\ R\sin u + r\sin u \cos v \end{pmatrix} \quad (1)$$

$$\hat{n}(u,v) := \begin{pmatrix} n_x \\ n_y \\ n_z \end{pmatrix} = \begin{pmatrix} \cos u \cos v \\ \sin v \\ \sin u \cos v \end{pmatrix} \quad (2)$$

R≥r is constrained to maintain the typical torus or "donut" shape, i.e. it prevents the surface from intersecting itself. Note that when the model has zero curvature (k=0), (1) contains a singularity (R is undefined) as R=1/k causing division by 0. The parametric equations for a cylinder do not contain this singularity, however. Hence, for this special case we test if k is below a small threshold and, if so, switch to the equivalent cylinder model. Ideally this threshold would be machine epsilon, but in reality, when k is very small the model fitting becomes much slower as R approaches a very large number.

Next, we determine which of the torus points the camera is unable to see, i.e. the blindspots, given the camera's field of view and the geometric properties of the torus. A point is considered unseen if it meets any of the following conditions. These conditions could in the future be extended to better match the clinical experience. For example, we may consider points seen only at the highly distorted edges of the camera frame or points seen only for a very short period of time as blindspots.

Condition 1 (Field of view): It is out of the camera's field of view, for example, behind the camera. In our experiments, the field of view is 140° with a 'truncated circle' shape (see FIG. 25, row 1) to match a typical colonoscope. Condition 1 is applied when projecting the surface points p from the world frame into the camera image. The test is performed in the 'clipping space' of the GPU rendering pipeline, which allows us to check whether points are within the viewing frustrum of the camera, as shown in FIG. 24 (left).

Condition 2 (Viewing distance): It is too far from the camera to see clearly (>50 mm, as discussed later). The image of the location contains little data and is not sufficiently detailed for screening. For condition 2, we simply test the length of ray r(t), as shown in FIG. 4 (center).

Condition 3 (Occlusion): It is hidden behind another area of mucosa at an acute bend in the colon. Condition 3 is tested by finding the first intersection point q for each ray r(t), i.e. the visible point in that direction. If this intersection point q is not coincident with the p the ray was cast to, then it is occluded. This is illustrated in FIG. 24 (right)—$p_2$ is not visible as the ray between the camera and point is blocked by another point on the torus.

Figure 24:
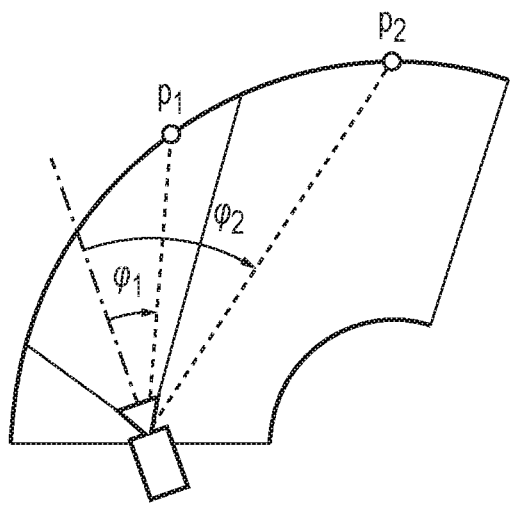
FIG. 24 shows a projection point cloud used for blind spot detection according to one or more illustrative aspects described herein.
Figure 24:
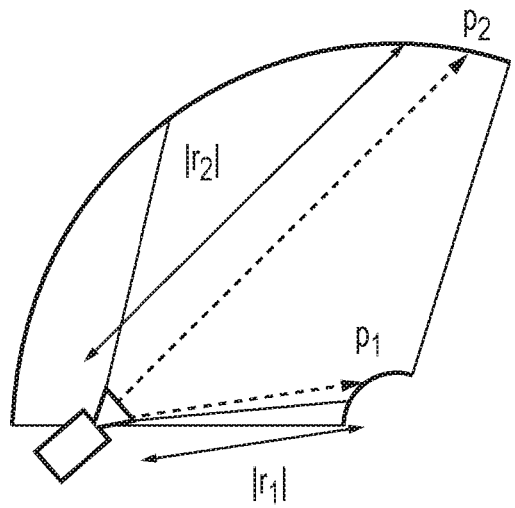
Figure 24:
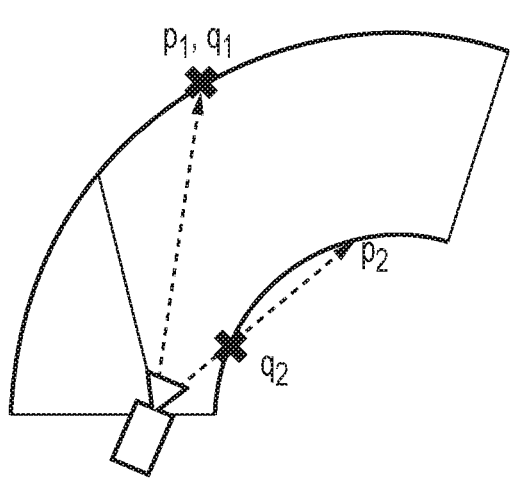

FIG. 24 shows the three conditions which define whether a point on the torus model is clear and visible to the camera. In each illustration, p_1 is considered visible while p_2 is not.

To find q, the parametric equations for the rays are substituted into the implicit equation of a torus and the square root eliminated algebraically. Solving for the roots we calculate up to 4 ray-torus intersection points, forming the set Q(t) (3). The real root with the smallest positive value of t gives the intersection point q which is closest to and ahead of the camera, i.e. the point which the camera sees.

$$Q(t)=(r_x^2+r_y^2+r_z^2+R^2-r^2)^2-4R^2(r_x^2+r_y^2)=0 \quad (3)$$

For occluded blindspots, we apply a further post-processing step. We observe that, typically, whereas the blindspots around bends are successfully detected, their areas are underestimated. The reason is that at the outside of a bend the tissue is stretched, flattening haustral folds and creating a gradual curve, while on the inside the opposite occurs creating a sharper curve. This can be seen in FIG. 25, row 2. In addition, as the outside of a bend typically has a larger visible area, it contributes more to the model fitting. We therefore apply 'occlusion boosting' which accounts for this underestimation by artificially expanding any blindspots predicted by occlusion (condition 3). In practice, we simply dilate the blindspot with a disk-shaped structuring element (of radius 10 mm) across the surface. This expands the border of the blindspot by 10 mm in all directions.

Panoramic Stitching

At this stage, the existence and location of blindspots can be detected for individual frames and in 3D space. These separate observations can then be combined over time to identify which areas have not been seen over the course of the procedure so far. This is achieved using a concept in which the model is virtually unfolded at each frame to produce a 2D slice in texture coordinates, which is then stitched into the cumulative map. Any missing areas on this 'panoramic map' have, by definition, never been seen. The map's axes are the distance along the colon's centerline and angle around the colon's cross-section.

For each frame, we use the fitted model to interpret the camera image. The frame is virtually unfolded, moving from a 3D to 2D projection. Blindspots detected on the model, in addition to textures observed in the image, are mapped onto each 2D slice of the colon. As points are generated on the surface of the torus in the same coordinate system, p(u, v), as the panoramic map, unfolding the torus model is simple. The surface color for each visible point is found by projecting it into the camera image, whereas unseen points are labelled as such.

In order to cumulatively stitch each slice into a panoramic map, we need to estimate the 2D transformations between each slice. As at each frame the model is, by definition, aligned with the centreline, we do not need to consider rotation or shear. We assume that the point cloud is generated with a consistent scale and, as such, do not need to consider scale. Therefore, the relative motion between slices can be described by a simple translation. A translation in the u direction corresponds to the distance along the colon's centreline. A translation in the v direction corresponds to the roll or 'twist' around the centreline. These two values can therefore be extracted from the relative transformation between subsequent models in 3D space, without needing to rely on image features for registration.

From the model fitting process, we know the transformation between the camera and model at each frame. From the inputs to our method, we know the camera's transformation between the previous and current frame. We can therefore calculate the transformation between the models of subsequent frames. According to our notation, the z direction of the model correspondents to the direction of the centreline. The distance the model has moved along the centreline is therefore the translation in the z direction of the previous model. As we are using a linear distance between the 2 models, this assumes that the model only moves a small distance between the frames. For translation in the v direction, we convert the rotation matrix to x-y-z Euler angles, where the z angle gives us the 'twist' between models.

Our stitching process then mosaics the 2D slices according to this transformation. Typically, the majority of tissue in a frame has been previously. Therefore, in order to keep only the highest quality texture data, we opt to keep the only the brightest data. For the overlapping areas we apply a gaussian filter to each slice, so that the brightness of broad regions is considered rather than that of the surface detail, and perform the comparison according to the value (brightness) channel in the HSV colour space.

Evaluation

For our experiments, we used the CT scans of patients from The Cancer Imaging Archive. We use CT data rather than optical colonoscopy video as it provides a ground truth which is otherwise unavailable. Both virtual and optical colonoscopies follow similar workflows, notably preparation (cleaning) and insufflation (inflation with gas) of the organ, hence the colon's morphology should be comparable between the two. A key difference is that in virtual colonoscopy there is no mechanical deformation of the organ by the colonoscope. The impact of this deformation is assumed to be small as the tissue ahead of the camera is not in contact with the colonoscope, leading to little or no noticeable deformation.

A 3D colonoscopy simulator has been developed in Unity by the IBM Europe Human Centric Innovation Center. The simulator creates colonoscopy video with ground truth data. The 3D model used is extracted from a CT scan as before and rendered with an artificial texture. In addition, objects can be added to the colon's wall to simulate polyps, endoscopic tattoos, scarring etc. The simulator mimics the parameters of real colonoscopes, including the field of view and resolution of the camera, and the characteristics of its light source. The endoscope is navigated through the colon using a keyboard and mouse. We perform ray casting at each frame to obtain the ground truth for which mucosa has been seen and label these faces accordingly. Simulated point clouds, used as an input to the method, are generated by extracting vertices according to our aforementioned blindspot conditions (FIG. 24).

Since no commercial system exists for comparison, the torus model was compared directly to the ground truth. The most closely related research employs a cylinder model. Nevertheless, we present comparisons between the cylinder model and our curved model. Please note that this is only within the context of our system, which includes differences beyond the model itself, such as the fitting process and blindspot detection.

To assess the need for curvature, we investigate the typical tortuosity of the colon. We extracted centrelines from 12 patients' colon scans and segmented it into 9308 50 mm lengths as a sliding window at 2 mm steps. These subsegments represent parts of the colon which would be seen by the camera as it progresses through the colon during an optical colonoscopy. The 50 mm length was selected by our experienced gastroenterologist to approximate the maximum distance from the camera at which screening could be performed. We define the bend angle of each subsegment as the angle between the start and end vectors, calculated using the cosine rule. We found that 50% of the subsegments had an angle of greater than 59° (the median), 10% greater than 121°, and 5% greater than 132°.

The remaining experiments were all performed on clips from 4 simulated colonoscopies, with a combined time of 7 minutes 15 seconds (13069 video frames) across 2.53 meters of colon. The simulated point clouds contained a median of 227 points. For each point on the predicted model, we compute the nearest point on the triangulated ground truth surface, forming a mapping between the two. The Euclidean distance between these two points thus represents the reconstruction error of that area. The predicted and ground truth visibility of each point can also be compared, allowing it to be classified as a true positive, true negative, false positive, or false negative. For classification purposes, here a positive result is defined as a blindspot, whereas a negative result is defined as an area which has been seen.

We now evaluate the surface reconstruction error of the model. Note, however, that while in general reconstruction accuracy should improve blindspot detection, this is not guaranteed. To measure the surface similarity of the seen areas we use the mean reprojection error (MRE) from the camera's perspective, as shown in FIG. 3, as for the interpretation of the camera's image this is the most meaningful. For the unseen areas, the reprojection error is undefined, and so we instead use the mean surface distance (MSD), which is the average of the point errors between the predicted and ground truth surfaces. For the seen areas, the MRE was 3.6 mm, while for the unseen areas, the MSD was 2.2 mm.

As described before, our error detection functions by thresholding the median reprojection error. In total, the torus model failed for 0.34% of frames. Any information in these frames in effectively unseen by the algorithm and therefore a high failure rate leads to increased number of false positives.

Figure 25:
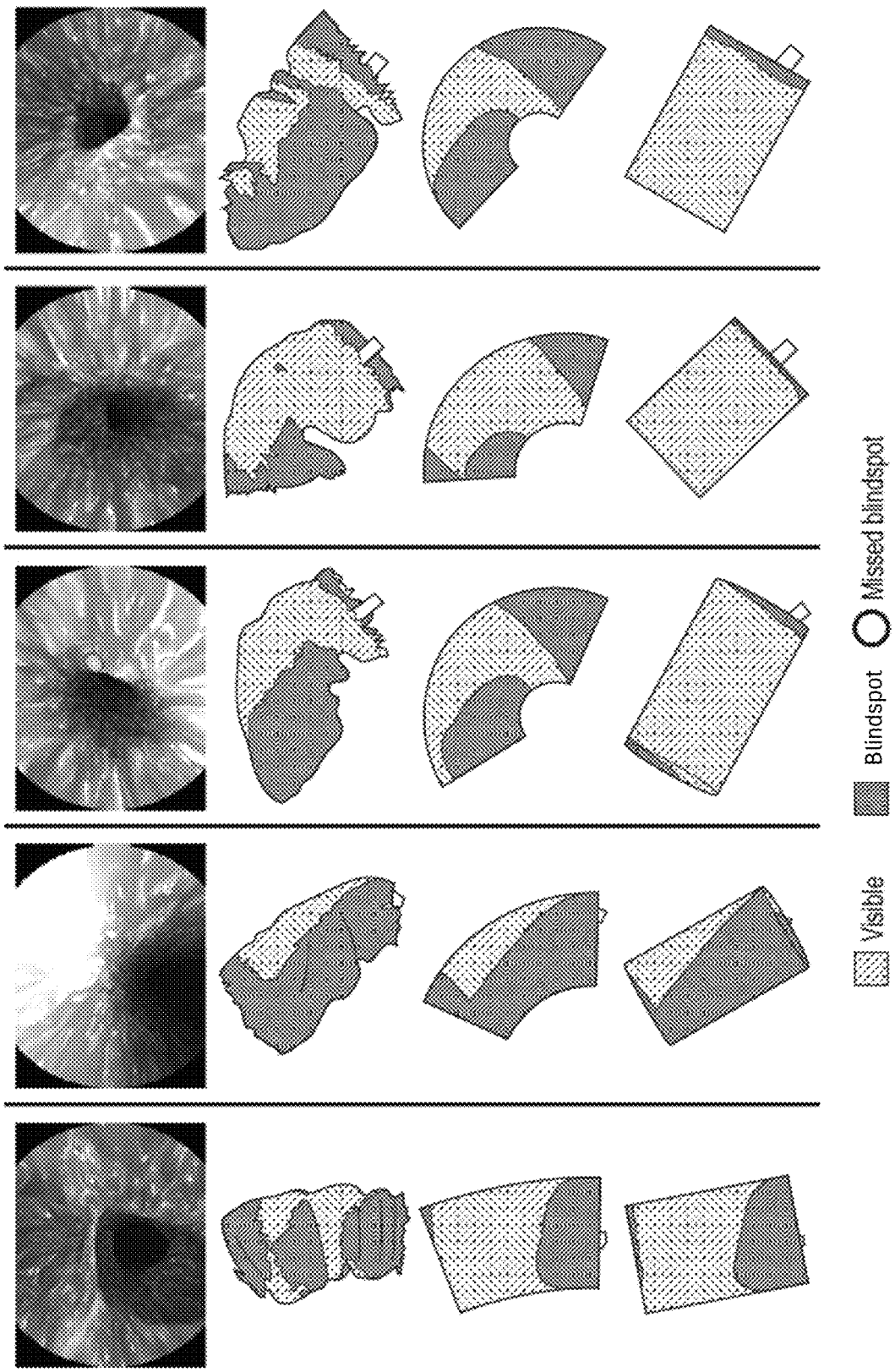
FIG. 25 shows sample frames from a simulated colonoscopy video and model predictions for visible tissue according to one or more illustrative aspects described herein.

FIG. 25 shows a sample of frames from a simulated colonoscopy video, the associated ground truth, and the torus and cylinder model predictions for which tissue is visible (or not). Note that at a relatively low curvature (column 1) the predictions of the torus and cylinder models are very similar, and both correctly predict the blindspots due to the camera's field of view and viewing distance. Also note that in column 1, as neither model attempts to predict blindspots behind the haustral folds, neither model predicts this blindspot. With increased curvature, blindspots appear on the inside of the bend due to occlusion. Lacking curvature, the cylinder model misses this blindspot in every case. The torus model, on the other hand, consistently predicts its existence, even in cases where the blindspot is small. Table II shows that the torus model predicts that marginally more points are either 'out of view' (condition 1) or 'too far' (condition 2) than the cylinder model. This is reasoned to be the result of more accurately representing the geometry of the colon. However, the addition of 'occlusion' (condition 3) increases the prediction of blindspots by 5.9% and up to 14.7% with occlusion boosting. This suggests that the most significant improvement of the torus model is not the accuracy of its reconstruction, but rather the fact that it is able to model and predict the occlusion which occurs at acute bends. This therefore demonstrates the need for modelling curvature, in addition to the fact that a simple curved model is sufficient to predict acute bends reliably. Column 5 shows a difficult case where a large haustral fold blocks the majority of the lumen. Although the torus model was not designed to handle such situations, haustral folds can sometimes locally appear as bends and therefore, as in this case, the torus model correctly identifies the blindspot behind the fold.

TABLE II

AVERAGE PERCENTAGE OF MODEL PREDICTED AS MISSED OR SEEN AT EACH FRAME, ACCORDING TO OUR BLINDSPOT CONDITIONS. THE TORUS MODEL IS EVALUATED WITH AND WITHOUT OCCLUSION BOOSTING (OB).

|  | Cylinder | Torus w/o OB | Torus w OB |
| --- | --- | --- | --- |
| Out of view | 24.1 | 28.4 | 28.4 |
| Too far | 2.8 | 3.8 | 3.8 |
| Occluded | 0 | 5.9 | 14.7 |
| Visible | 73.1 | 61.9 | 53.1 |

We now evaluate the blindspot prediction against the ground truth on a 'per-frame' basis, that is, evaluating each frame independently rather than fusing the information from multiple models. The results of this can be seen in Table III. Note that as blindspots behind haustral folds are not predicted but are measured, there is a limit to the maximum achievable sensitivity and F-score, which is a measure of accuracy. These results test the effectiveness of the model as a whole, not only for blindspots at acute bends. The results for the torus model show a high F-score, especially when considering the model's simplicity. The curved torus model is shown to be considerably more sensitive than the non-curved cylinder model, detecting 49% more of the ground truth blindspot area (when occlusion boosting is used).

TABLE III

PER-FRAME BLINDSPOT CLASSIFICATION. ALL VALUES ARE PERCENTAGES. THE TORUS MODEL IS EVALUATED WITH AND WITHOUT OCCLUSION BOOSTING (OB).

|  | Cylinder | Torus w/o OB | Torus w OB |
| --- | --- | --- | --- |
| Sensitivity | 54.6 | 72.0 | 81.6 |
| Precision | 89.6 | 92.0 | 85.5 |
| F-score | 67.9 | 80.7 | 83.5 |

By nature, there is a trade-off between precision and sensitivity which the level of occlusion boosting affects. Increasing the radius of the structuring element used for occlusion boosting increases sensitivity and decreases precision. However, note from Table III that even without occlusion boosting, the torus model is both slightly more precise and considerably more sensitive than the cylinder model. F-score is commonly used to measure a test's accuracy and equally weights sensitivity and precision. As the torus model tends to underpredict the blindspot area at acute bends, the F-score measure rewards occlusion boosting up to a certain point. From our experiments, the optimum F-score was achieved with a radius of 10 mm, as used throughout the paper. However, as the potential risk of a false negative likely far outweighs the inconvenience of a false positive, hospitals may reasonably take a more precautious approach, prioritizing sensitivity over precision and increasing occlusion boosting further.

TABLE IV

CLASSIFICATION SUCCESS OF THE BLINDSPOT
MAP FOR EACH SIMULATION. WE USE THE TORUS
MODEL WITH OCCLUSION BOOSTING. TP =
TRUE POSITIVE, FN = FALSE NEGATIVE,
FP = FALSE POSITIVE, WHERE POSITIVE = BLINDSPOT.

|             | #1   | #2   | #3   | #4   | Total |
|-------------|------|------|------|------|-------|
| TP          | 5    | 5    | 2    | 8    | 20    |
| FN          | 5    | 5    | 5    | 1    | 16    |
| FP          | 0    | 0    | 0    | 0    | 0     |
| Sensitivity | 50%  | 50%  | 29%  | 89%  | 56%   |
| Precision   | 100% | 100% | 100% | 100% | 100%  |
| F-score     | 67%  | 67%  | 44%  | 94%  | 71%   |

We create a ground truth blindspot map by virtually unfolding the ground truth model in such a way as to give a comparable projection to the estimated blindspot map. This is achieved by casting a ring of rays at uniform steps along the centerline, as in [23]. For each ray, we check whether the face which it hits has been seen or not and update the map accordingly. Bright blue polyps were included to the simulation to act as points of reference between the ground truth and prediction. The correctness of blindspot classification in the blindspot maps was evaluated by an expert with reference to the colonoscopy video, ground truth and estimated blindspot maps. The results are shown in Table IV. Across the 4 colonoscopies, we have a sensitivity of only 56%, despite a precision of 100%. Determining how many of the ground truth blindspots were caused by haustral folds (which our method does not detect) is challenging due to the ambiguities of classifying blindspots by their cause, either manually or algorithmically. FIG. 6 presents an estimated and ground truth blindspot map with frames corresponding to the true positive and false negative blindspots. The simulated colonoscopy covered 62 cm of colon, from the splenic flexure to the rectum.

Our system has been built in MATLAB and run on a standard CPU (Intel Core i7 8650U). We note that the processing speed increases exponentially with the resolution of the panoramic map due to the use of ray casting. However even at the high resolution of 3 pixels/mm that we used for our experiments, the mean processing speed of our system was only 737 ms/frame. The vast majority of this, 610 ms, was from the ray casting, which if run on a GPU would be almost negligible. Another 82 ms is from the non-linear fitting algorithm and the remaining 45 ms is from the panoramic stitching. These could be optimized but simply compiling the code is expected to easily meet the requirement of 30 Hz (33 ms/frame) needed for real-time colonoscopy, giving room for the additional overhead of pre-processing the video and extracting the sparse point cloud.

DISCUSSION

The data that we have presented herein demonstrates that by modelling the local structure of the colon with a curved model, we are able to predict blindspots with a high sensitivity. The only inputs to the model are the endoscopic video and a sparse point cloud, which can be extracted from the video in real-time using one of many pre-existing methods. The model has a high level of reliability and the run time is very low compared to other methods. For our experiments we used CT data which gave us a ground truth against which we could compare our estimates. To our knowledge, this is the first time that real medical data has been used to quantitatively evaluate a parametric model of the colon, with previous research either using synthetic data or presenting results qualitatively. Considering all of the above, we therefore believe that these results indicate strong potential for the real-world application of our curved model.

Figure 26:
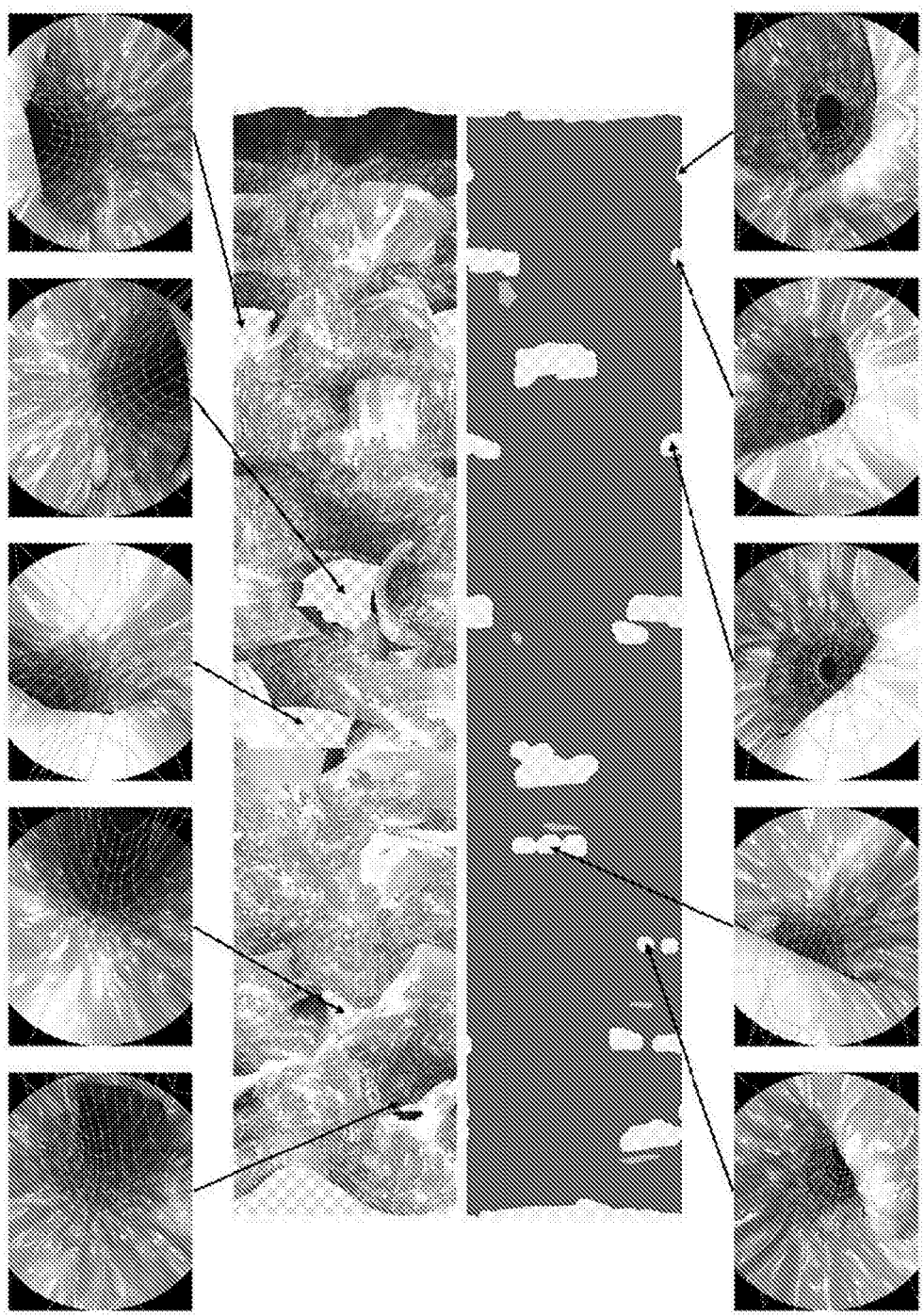
FIG. 26 shows a blindspot map according to one or more illustrative aspects described herein.

Overall, fusing the models across frames to create a blindspot map provided a relatively low sensitivity. However, breaking the data down into the 4 constituent colonoscopies as in Table IV shows that simulation #4 provided considerably stronger results. By observing the system progress in real-time, it's clear that the discrepancy is caused by this colon model having relatively unpronounced haustral folds. More pronounced haustral folds create more blindspots which are undetectable without modelling these folds, which we do not do. This can be seen in FIG. 26—correctly identified blindspots occur at acute bends where the inside of the bend is not inspected, whereas missed blindspots occur where a haustral fold is present. As such we propose that in the future the curved model be used in tandem with one of the other methods which model the haustral folds but also rely on them being visible. More pronounced folds also cause more complex geometry, challenging the stability of the system. In particular, it can cause the model fitting to fail for a series of frames or to vary erratically between frames. This in turn generates an unreliable estimate of the cumulative centerline, meaning that slices are not stitched onto the panoramic map in their correct location. We also note that the 'per-frame' sensitivity (82%, see Table III) is considerably higher than that of the blindspot map (56%, see Table IV). This result is simply an extension of the aforementioned stitching issues. As the blindspot map is binary, an area is either seen or unseen, a stitching error for even a single frame can cause an area to be incorrectly but irreversibly defined as "seen".

Compared to the state-of-the-art, our method has a number of unique advantages. First, the torus model is the only existing method for detecting blindspots at acute bends and predicting their geometry, as other methods do not consider the curved topology of the colon. SLAM methods, meanwhile, will fail with tissue deformation and, as discussed earlier, do not predict the geometry of unseen areas. Second, we are the first to fit a model of the colon to colonoscopy frames through optimization against a point cloud. The model used could, in theory, also be more complex than the torus model, e.g. incorporating haustral folds. Prior research has only used heuristic methods, such as detecting haustral folds or rotating the cylinder model to orientate towards the darkest point. These heuristic methods are not generalizable, and each have unique limitations such as needing to see the lumen of the colon. While a number of methods already use sparse reconstruction to create a point cloud, either for direct sparse odometry or for supervising haustral fold estimation, none actively exploit the full 3D information contained. Lastly, our method is particularly computationally inexpensive. For example, one prior art method has a mean processing time of 1.5 min/frame. Our system, under similar processing conditions, is 122 times faster, even when set to a high-resolution output.

Various modifications, whether by way of addition, subtraction or modification, may be made to the above described examples to provide further examples, any and all of which are intended to be encompassed by the appended claims.

REFERENCES

[1] J. E. Bernth, J. Back, G. Abrahams, L. Lindenroth, B. Hayee, and H. Liu, "Endoscope Force Generation and Intrinsic Sensing with Environmental Scaffolding," in 2019 International Conference on Robotics and Automation (ICRA), 2019, pp. 1940-1946.

[2] J. E. Bernth, A. Arezzo, and H. Liu, "A Novel Robotic Meshworm with Segment-Bending Anchoring for Colonoscopy," IEEE Robot. Autom. Lett., pp. 1-1, 2017.

[3] L. Wu et al., "Randomised controlled trial of WISENSE, a real-time quality improving system for monitoring blind spots during esophagogastroduodenoscopy," Gut, March 2019.

[4] N. Srinivasan, M. Szewczynski, F. Enders et al., "Real-time Feedback Improves the Quality of Colonoscopy by Trainees: A Controlled Clinical Trial," American Journal of Gastroenterology, 2012.

[5] D. Hong, W. Tavanapong, J. Wong, J. H. Oh, and P. C. de Groen, "three-dimensional Reconstruction of virtual colon structures from colonoscopy images," Comput. Med. Imaging Graph., vol. 38, no. 1, pp. 22-33, 2014.

[6] M. A. Armin et al., "Visibility Map: A New Method in Evaluation Quality of Optical Colonoscopy," in Medical image computing and computer-assisted intervention (MICCAI), 2015, pp. 396-404.

[7] J. Zhou, A. Das, F. Li, and B. Li, "Circular Generalized Cylinder fitting for three-dimensional reconstruction in endoscopic imaging based on MRF," 2008 IEEE Comput. Soc. Conf. Comput. Vis. Pattern Recognit. Work. CVPR Work., 2008.

[8] D. Freedman et al., "Detecting Deficient Coverage in Colonoscopies," arXiv preprint, March 2020.

[9] L. Lindenroth, C. Duriez, J. Back, K. Rhode, and H. Liu, "Intrinsic force sensing capabilities in compliant robots comprising hydraulic actuation," IEEE Int. Conf. Intell. Robot. Syst., vol. 2017-September, pp. 2923-2928, 2017.

The invention claimed is:

1. A method for visualising a three-dimensional internal surface of a region of interest in a lumen comprising:
   collecting image data from a camera mounted on an endoscope moving through the region of interest;
   collecting motion data in relation to the motion of the endoscope;
   collecting endoscope shape data in relation to the shape of the endoscope;
   inputting the image data into an algorithm trained to determine camera pose from input image data, and obtaining pose data of the camera relative to the lumen; and
   inputting the pose data, the motion data and the endoscope shape data into a model program to virtually construct a three-dimensional model of the three-dimensional internal surface of the region of interest;
   wherein the endoscope is a flexible soft robot comprising one or more soft segments able to conform to a shape of the lumen, wherein the one or more soft segments each comprise at least one fluid actuated internal chamber, wherein a pressure and a volume in the at least one fluid actuated internal chamber is used to sense the shape of the soft robot to provide endoscope shape data.

2. A method according to claim 1, wherein the endoscope shape data is
   a) used as an additional input into the algorithm;
   b) obtained using optical, mechanical sensing or electromagnetic sensing; or
   c) corrected for spatial and/or temporal offset from the image data.

3. A method according to claim 1, wherein the image and/or endoscope shape data comprises curvature of the lumen's central axis.

4. A method according to claim 1, wherein the motion data comprises insertion depth data.

5. A method according to claim 1, wherein the model program assumes one or more of the following:
   a) constant curvature of the region of interest;
   b) circular cross-sections of the region of interest; or
   c) non-circular and/or varying cross-sections of the region of interest.

6. A method according to claim 1, wherein the three-dimensional model shows the locations of blind spots where the camera cannot obtain image data.

7. A method according to claim 6, wherein the blind spots are caused by one or more of the following conditions:
   a) the blind-spot being outside the camera field of view;
   b) the blind spot being too distant from the camera; and/or
   c) the blind spot being occluded by other parts of the lumen.

8. A method according to claim 1, further comprising virtually unfolding the three-dimensional model to form a two-dimensional model of the internal surface of the lumen, wherein the two-dimensional model shows the locations of blind spots where the camera cannot obtain image data.

9. A method according to claim 1, wherein the image data is optical image data.

10. A method according to claim 1, wherein the lumen is a gastrointestinal tract, and more preferably the lumen is a colon.

11. A method according to claim 1, wherein the algorithm additionally outputs properties of the lumen to be used as additional inputs into the model program.

12. A method according to claim 11, wherein the properties of the lumen comprise one or more of:
   a magnitude of curvature in the region of interest;
   a direction of constant curvature in the region of interest;
   a length of the region of interest;
   a radius of the region of interest;
   one or more cross-sections of the region of interest;
   one or more lengths of haustra in the region of interest; and
   one or more depths of haustra in the region of interest.

13. A method for visualising a three-dimensional internal surface of a region of interest in a lumen comprising:
   collecting image data from a camera mounted on an endoscope moving through the region of interest, the image data comprising a plurality of frames;
   inputting the plurality of frames into an algorithm trained to determine camera pose and lumen curvature from input image data, and obtaining pose data of the camera relative to the lumen corresponding to each frame and image shape data corresponding to the lumen curvature;
   inputting the pose data and the image shape data into a curved lumen model program;
   outputting a plurality of three-dimensional models of the internal surface of the lumen, each model corresponding to each frame;
   combining the plurality of three-dimensional models to obtain a final three-dimensional model of the internal surface of the region of interest.

14. A method according to claim 13, further comprising:
   collecting endoscope shape data in relation to the shape of the endoscope; and
   inputting the endoscope shape data into the curved lumen model program as an additional input.

15. A method according to claim 13, further comprising:
   collecting motion data in relation to the motion of the endoscope; and inputting the motion data into the curved lumen model program as an additional input.

16. One or more non-transitory computer readable media storing computer-executable instructions that, when executed by a processor, configure a data processing system to visualize a three-dimensional internal surface of a region of interest in a lumen by performing:
    collecting image data from a camera mounted on an endoscope moving through the region of interest, the image data comprising a plurality of frames;
    inputting the plurality of frames into an algorithm trained to determine camera pose and lumen curvature from input image data, and obtaining pose data of the camera relative to the lumen corresponding to each frame and image shape data corresponding to the lumen curvature;
    inputting the pose data and the image shape data into a curved lumen model program;
    outputting a plurality of three-dimensional models of the internal surface of the lumen, each model corresponding to each frame;
    combining the plurality of three-dimensional models to obtain a final three-dimensional model of the internal surface of the region of interest.

17. The computer readable media of claim 16, wherein the data processing system is further configured to perform:
    collecting endoscope shape data in relation to the shape of the endoscope; and
    inputting the endoscope shape data into the curved lumen model program as an additional input.

18. The computer readable media of claim 16, wherein the data processing system is further configured to perform:
    collecting motion data in relation to the motion of the endoscope; and
    inputting the motion data into the curved lumen model program as an additional input.

\* \* \* \* \*